(12) United States Patent
Han et al.

(10) Patent No.: US 11,239,950 B2
(45) Date of Patent: *Feb. 1, 2022

(54) METHOD FOR CONFIGURING CHANNEL STATE INFORMATION REPORTING BAND AND COMMUNICATIONS APPARATUS

(71) Applicant: Huawei Technologies Co., Ltd., Shenzhen (CN)

(72) Inventors: Wei Han, Shanghai (CN); Yong Liu, Shanghai (CN); Shibin Ge, Shanghai (CN); Huangping Jin, Shanghai (CN); Xiaoyan Bi, Shanghai (CN); Xiang Ren, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

This patent is subject to a terminal disclaimer.

(21) Appl. No.: 16/697,115

(22) Filed: Nov. 26, 2019

(65) Prior Publication Data

US 2020/0099473 A1 Mar. 26, 2020

Related U.S. Application Data

(63) Continuation of application No. 16/237,465, filed on Dec. 31, 2018, now Pat. No. 10,511,411, which is a
(Continued)

(30) Foreign Application Priority Data

Jan. 12, 2018 (CN) .......................... 201810032711.5

(51) Int. Cl.
*H04L 1/06* (2006.01)
*H04L 5/00* (2006.01)
(Continued)

(52) U.S. Cl.
CPC ......... *H04L 1/0693* (2013.01); *H04B 7/0626* (2013.01); *H04L 1/0026* (2013.01);
(Continued)

(58) Field of Classification Search
CPC .... H04B 7/0626; H04B 7/0669; H04B 7/068; H04L 1/0026; H04L 1/0028;
(Continued)

(56) References Cited

U.S. PATENT DOCUMENTS 8,681,627 B2 3/2014 Choudhury et al.
2010/0214937 A1 8/2010 Chen et al.
(Continued)

FOREIGN PATENT DOCUMENTS

CN 101567714 A 10/2009
CN 102158874 A 8/2011
(Continued)

OTHER PUBLICATIONS

"Remaining details on subband CSI reporting," 3GPP TSG RAN WG1, Reno, USA, R1-1720300, XP051368949, pp. 1-4, 3rd Generation Partnership Project, Valbonne, France (Nov. 27-Dec. 1, 2017).
(Continued)

*Primary Examiner* — Kan Yuen
(74) *Attorney, Agent, or Firm* — Leydig, Voit & Mayer, Ltd.

(57) ABSTRACT

An apparatus and method are provided for a quantity and size of subbands in a channel state information (CSI) reporting band for flexibility and reduced complexity of terminal addressing. The method includes: determining a channel state information subband size based on a bandwidth part (BWP), determining a quantity of channel state information subbands included in a channel state information reporting band based on (i) a carrier bandwidth (CC
(Continued)

bandwidth), (ii) the BWP bandwidth or (iii) a channel state information reference signal (CSI-RS) bandwidth and the channel state information subband size. The method further includes determining an actual quantity of resource blocks included in a starting subband and an actual quantity of resource blocks in an ending subband in the channel state information subband.

15 Claims, 14 Drawing Sheets

Related U.S. Application Data continuation of application No. PCT/CN2018/092169, filed on Jun. 21, 2018.

(51) Int. Cl.
  *H04B 7/06* (2006.01)
  *H04L 1/00* (2006.01)
(52) U.S. Cl.
  CPC ............ *H04L 5/006* (2013.01); *H04L 5/0048* (2013.01); *H04L 5/0092* (2013.01); *H04B 7/068* (2013.01); *H04B 7/0669* (2013.01); *H04L 1/0028* (2013.01)
(58) Field of Classification Search
  CPC ..... H04L 1/0693; H04L 5/001; H04L 5/0023; H04L 5/0035; H04L 5/0048; H04L 5/0057; H04L 5/006; H04L 5/0064; H04L 5/0091; H04L 5/0092; H04W 72/04; H04W 72/0453
  See application file for complete search history.

(56) References Cited

U.S. PATENT DOCUMENTS

| | | | |
|---|---|---|---|
| 2011/0034198 A1 | 2/2011 | Chen et al. | |
| 2011/0305161 A1 | 12/2011 | Ekpenyong et al. | |
| 2012/0320778 A1 | 12/2012 | Lv et al. | |
| 2013/0156125 A1* | 6/2013 | Ko | H04L 25/03949 375/267 |
| 2013/0322376 A1 | 12/2013 | Marinier et al. | |
| 2015/0071233 A1 | 3/2015 | Wang et al. | |
| 2015/0215928 A1 | 7/2015 | Davydov et al. | |
| 2015/0327246 A1 | 11/2015 | Kim et al. | |
| 2017/0026953 A1 | 1/2017 | Wang et al. | |
| 2017/0134068 A1* | 5/2017 | Ahn | H04L 27/2602 |
| 2017/0188350 A1 | 6/2017 | Kim et al. | |
| 2017/0367046 A1* | 12/2017 | Papasakellariou | H04W 72/0453 |
| 2018/0076924 A1 | 3/2018 | Lee et al. | |
| 2018/0212739 A1 | 7/2018 | Kim et al. | |
| 2020/0021410 A1* | 1/2020 | Choi | H04L 5/0051 |

FOREIGN PATENT DOCUMENTS

| | | |
|---|---|---|
| CN | 102237958 A | 11/2011 |
| CN | 102255685 A | 11/2011 |
| CN | 102263583 A | 11/2011 |
| CN | 102307081 A | 1/2012 |
| CN | 102801498 A | 11/2012 |
| CN | 103178929 A | 6/2013 |
| CN | 105229955 A | 1/2016 |
| CN | 105429683 A | 3/2016 |
| CN | 106411377 A | 2/2017 |
| CN | 106507486 A | 3/2017 |
| CN | 106559109 A | 4/2017 |
| CN | 104995857 B | 6/2019 |
| CN | 105934967 B | 10/2019 |
| JP | 2013543308 A | 11/2013 |
| JP | 2017228813 A | 12/2017 |
| WO | 2013170420 A1 | 11/2013 |
| WO | 2015147593 A1 | 10/2015 |
| WO | 2015149333 A1 | 10/2015 |

OTHER PUBLICATIONS

"3rd Generation Partnership Project Technical Specification Group Radio Access Network NR Radio Resource Control (RRC) Protocol specification (Release 15)," 3GPP TS 38,331 V1.0.0, XP051670285, pp. 1-188, 3rd Generation Partnership Project, Valbonne, France (Dec. 2017).
"On CSI subband size," 3GPP TSG RAN WG1, Reno, USA, R1-1720723, XP051370179, pp. 1-6, 3rd Generation Partnership Project, Valbonne, France (Nov. 27-Dec. 1, 2017).
"3rd Generation Partnership Project Technical Specification Group Radio Access Network NR Radio Resource Control (RRC) Protocol specification (Release 15)," 3GPP TSG-RAN WG2 Meeting #101, R2-1803828, Athens, Greece, pp. 1-268, 3rd Generation Partnership Project, Valbonne, (Feb. 26-Mar. 2, 2016).
"Summary of remaining issues for CSI reporting," 3GPP TSG RAN WG1 Ad Hoc Meeting, R1-1800095, Vancouver, Canada, pp. 1-8, 3rd Generation Partnership Project, Valbonne, France (Jan. 22-26, 2018).
"Remaining issues for CSI framework," 3GPP TSG RAN WG1 Ad Hoc Meeting, R1-1800529, Vancouver, Canada, pp. 1-6, 3rd Generation Partnership Project, Valbonne, France (Jan. 22-26, 2018).
"draftCR to 38-214 capturing the Jan. 18 ad-hoc and RAN1#92 meeting agreements," 3GPP TSG-RAN1 Meeting #92 R1-1803555, Athens, Change Request 38-214, pp. 1-79, 3rd Generation Partnership Project, Valbonne, France Feb. 26-Mar. 1, 2018).
"On remaining details of CSI reporting," 3GPP TSG-RAN WG1 #91, Reno, USA, R1-1720734, pp. 1-11, 3rd Generation Partnership Project, Valbonne, France (Nov. 27-Dec. 1, 2017).
"3rd Generation Partnership Project;Technical Specification Group Radio Access Network; NR; Physical layer procedures for data (Release 15)," 3GPP TS 38.214 V2.0.0, R2-172416, pp. 1-71, 3rd Generation Partnership Project, Valbonne, France (Dec. 2017).
"3rd Generation Partnership Project;Technical Specification Group Radio Access Network; NR; Physical layer procedures for data (Release 15)," 3GPP TS 38.214 V1.3.0, R1-1721344, pp. 1-71, 3rd Generation Partnership Project, Valbonne, France (Dec. 2017).
"On CSI subband size," 3GPP TSG-RAN WG1 #91, Reno, USA, R1-1720723, pp. 1-5, 3rd Generation Partnership Project, Valbonne, France (Nov. 27-Dec. 1, 2017).
"Presentation of Specification to TSG:TS38.214, Version 2.0.0," 3GPP TSG-RAN Meeting #78, Lisbon, Portugal, RP-172416, 1 page, 3rd Generation Partnership Project, Valbonne, France (Dec. 18-21, 2017).
"Partial band CSI reporting," 3GPP TSG-RAN WG1 NR Ad Hoc #3, Nagoya, Japan, R1-1716360, pp. 1-6, 3rd Generation Partnership Project, Valbonne, France (Sep. 18-21, 2017).
"3rd Generation Partnership Project; Technical Specification Group Radio Access Network NR Radio Resource Control (RRC) protocol specification (Release 15)," 3GPP TS 38.331 V15.0.0, 3rd Generation Partnership Project, Valbonne, France (Dec. 2017).
"3rd Generation Partnership Project; Technical Specification Group Radio Access Network; NR; Physical channels and modulation (Release 15)," 3GPP TS 38.211 V15.0.0, pp. 1-73, 3rd Generation Partnership Project, Valbonne, France (Dec. 2017).
3rd Generation Partnership Project;Technical Specification Group Radio Access Network; Evolved Universal Terrestrial Radio Access (E-UTRA); Radio Resource Control (RRC); Protocol specification (Release 14), 3GPP TS 36.331 V14.4.0, pp. 1-753, 3rd Generation Partnership Project (Sep. 2017).
"Remaining issues for CSI framework," 3GPP TSG RAN WG1 Meeting #91, Reno, USA, R1-1719426, pp. 1-8, 3rd Generation Partnership Project, Valbonne, France (Nov. 27-Dec. 1, 2017).
"3rd Generation Partnership Project;Technical Specification Group Radio Access Network; Evolved Universal Terrestrial Radio Access (E-UTRA); Physical layer procedures (Release 14)," 3GPP TS 36.213 V14.4.0, pp. 1-462, 3rd Generation Partnership Project, Valbonne, France (Sep. 2017).

(56) References Cited

OTHER PUBLICATIONS

"On remaining details of CSI reporting," 3GPP TSG RAN WG1 Meeting 90bis, Prague, CZ, R1-1718432, pp. 1-14, 3rd Generation Partnership Project, Valbonne, France (Oct. 9-13, 2017).
"3rd Generation Partnership Project; Technical Specification Group Radio Access Network; NR; Physical layer procedures for data (Release 15)," 3GPP TS 38.214 V15.0.0, pp. 1-71, 3rd Generation Partnership Project, Valbonne, France (Dec. 2017).
"Presentation of Specification TS 38.331, Version 1.0.0," 3GPP TSG-RAN Meeting #77, Lisbon, Portugal, RP-172570, p. 1, 3rd Generation Partnership Project, Vabonne, France (Dec. 18-21, 2017).
"Discussion on CSI reporting," 3GPP TSG RAN WG1 Meeting #91, Reno, USA, R1-1720866, pp. 1-4, 3rd Generation Partnership Project, Valbonne, France (Nov. 27-Dec. 1, 2017).
"Partial band CSI reporting," 3GPP TSG-RAN WG1 NR Ad Hoc #3, Nagoya, Japan, R1-1716360, pp. 1-5, 3rd Generation Partnership Project, Valbonne, France (Sep. 18-21, 2017).
"Partial band CSI reporting," 3GPP TSG-RAN WG1 #91, Nagoya, Japan, R1-1720734, 3rd Generation Partnership Project, Valbonne, France (Sep. 18-21, 2017).
U.S. Appl. No. 16/237,465, filed Dec. 31, 2018.

\* cited by examiner

| CC (in RBs) | CC (in 4RB SBs) | BWP (4RB SBs) | CSI - RS (4RB unit) | CSI (4RB SBs) | Actual SBS (in RBs) | Reporting band *1 (SB grid on CC BW) |
|---|---|---|---|---|---|---|
| 0–3 | 0 | | | 0 | 4RB | x |
| 4–7 | 1 | | | 1 | 4RB | x |
| 8–11 | 2 | | | 2 | 4RB | 0 |
| 12–15 | 3 | | | 3 | 4RB | x |
| 16–19 | 4 | | | 4 | 4RB | x |
| 20–23 | 5 | | | 5 | 4RB | x |
| 24–27 | 6 | | | 6 | 4RB | x |
| 28–31 | 7 | | | | | 0 |
| 32–34 | 8 | | | | | 0 |

FIG. 7

| BWP (4RB SBs) | CSI - RS (4RB unit) | CSI (4RB SBs) | Actual SBS (in RBs) | Reporting band *1 (SB grid on BWP BW) |
|---|---|---|---|---|
| 0 | | 0 | 4RB | x |
| 1 | | 1 | 4RB | x |
| 2 | | 2 | 4RB | 0 |
| 3 | | 3 | 4RB | x |
| 4 | | 4 | 4RB | x |
| 5 | | 5 | 4RB | x |
| 6 | | 6 | 4RB | x |
| 7 | | | | 0 |

FIG. 10

| BWP (8RB SBs) | CSI - RS (4RB unit) | CSI (4RB SBs) | Actual SBS (in RBs) | Reporting band *1 (SB grid on BWP BW) |
|---|---|---|---|---|
| 0 | | 0 | 8RB | x |
| 1 | | 1 | 8RB | x |
| 2 | | 2 | 8RB | x |
| 3 | | 3 | 4RB | x |

FIG. 11

| CSI (4RB SBs) | Actual SBS (in RBs) |
|---|---|
| 0 | 4RB |
| 1 | 4RB |
| 2 | 4RB |
| 3 | 4RB |
| 4 | 4RB |
| 5 | 4RB |
| 6 | 4RB |

| Reporting band *1 (SB grid on CSI - RS BW) |
|---|
| x |
| x |
| x |
| x |
| x |
| x |
| x |

FIG. 13

METHOD FOR CONFIGURING CHANNEL STATE INFORMATION REPORTING BAND AND COMMUNICATIONS APPARATUS

CROSS-REFERENCE TO RELATED APPLICATIONS

This application is a continuation of U.S. patent application Ser. No. 16/237,465, filed on Dec. 31, 2018 (Now U.S. Pat. No. 10,511,411), which is a continuation of International Application No. PCT/CN2018/092169, filed on Jun. 21, 2018. The International Application claims priority to Chinese Patent Application No. 201810032711.5, filed on Jan. 12, 2018. All of the afore-mentioned patent applications are hereby incorporated by reference in their entireties.

TECHNICAL FIELD

Embodiments of the present application relate to communication technologies, and in particular, to a channel measurement method, a transmit end device, and a receive end device.

BACKGROUND

Obtaining channel state information (CSI) through channel measurement is very important for improving transmission quality of wireless communication. During channel measurement, a receive end device (for example, user equipment such as a smartphone) obtains channel state information based on a reference signal (RS) transmitted by a transmit end device (for example, an access device such as a base station), and feeds back the obtained CSI to the transmit end device. The transmit end device processes a transmit signal based on the CSI and sends the processed transmit signal to the receive end device. It can be learned from the above that wireless transmission based on CSI is more compatible with a channel environment. Therefore, transmission quality is better.

The CSI may be usually sent from the receive end device to the transmit end device by using a physical uplink shared channel (PUSCH). The CSI transmitted by using the PUSCH may include wideband CSI, or may include a plurality of pieces of subband CSI, or may include both wideband CSI and a plurality of pieces of subband CSI. The wideband CSI may be understood as CSI obtained through calculation based on a wideband, and the subband CSI may be understood as CSI obtained through calculation based on a subband.

Usually, a network device needs to indicate a subband included in a CSI reporting band to a terminal, and the terminal performs CSI reporting on the indicated CSI reporting band. Sizes and quantity of subbands in the CSI reporting band need to be configured.

In the prior art, the quantity of subbands included in a CSI reporting band is configured based on a system bandwidth. However, with network evolution, this manner cannot be used for configuring the quantity of subbands included in a CSI reporting band.

SUMMARY

In view of this, it is necessary to provide a method for configuring and reporting a channel state information reporting band and a corresponding apparatus, to satisfy a network evolution requirement.

According to a first aspect of embodiments of the present application, a method for configuring a channel state information reporting band (CSI reporting band) is provided and includes determining a channel state information subband size based on a bandwidth part (BWP) bandwidth, and determining, a quantity of channel state information subbands included in a channel state information reporting band, based on a carrier component (CC) bandwidth or the bandwidth part BWP or a channel state information reference signal (CSI-RS) bandwidth, and the channel state information subband size.

The channel state information subband size is a maximum quantity of resource blocks included in the channel state information subband, and the maximum quantity of resource blocks in the channel state information subband is determined by a total quantity of resource blocks included in the bandwidth part (BWP) bandwidth.

The method may be performed by a transmit end device, and the transmit end device may be a network device or a terminal. In other words, the method procedure of the first aspect provided in this application may be performed by a network device or a terminal. The network device may first configure a size, a quantity, a starting location, an ending location, and the like of subbands that are included in a CSI reporting band, and then indicate the information to the terminal. Alternatively, the terminal may configure, by itself based on the method, a size, a quantity, a starting location, and an ending location of subbands that are included in a CSI reporting band, and send the information to the network device as a configuration suggestion. Alternatively, another possible implementation is that the network device configures partial information of a CSI reporting band and then sends the information to the terminal device, and the terminal device completes subsequent configuration.

In a first possible design, after the determining a quantity of channel state information subbands included in a channel state information reporting band, the method further includes sending, to a receive end device, reporting subband configuration information indicating that each channel state information subband is a reporting subband or a non-reporting subband, where, in other words, the reporting subband configuration information is used to indicate which subband in the channel state information reporting band is a reporting subband and which subband is not a reporting subband, and the reporting subband configuration information is represented by using information bits, and a quantity of information bits is the same as the quantity of channel state information subbands included in the channel state information reporting band.

In an implementation of the first possible design, the reporting subband configuration information indicates the quantity of channel state information subbands or further indicates a starting location of the channel state information subband or a starting location and an ending location of the channel state information subband.

The reporting subband configuration information includes a first information bit. The first information bit is used to indicate a reporting subband or a non-reporting subband in the channel state information subbands in the reporting band, that is, indicate which subband in the channel state information subbands is a reporting subband and which subband is a non-reporting subband. In other words, the reporting subband configuration information is implemented by using a bitmap.

Optionally, the channel state information subbands in the reporting band may be reporting subbands, or some of the channel state information subbands are reporting subbands and remaining channel state information subbands are non-reporting subbands. The reporting subband may be represented by using an information bit 1, and the non-reporting subband may be represented by using an information bit 0; or the reporting subband is represented by using an information bit 0, and the non-reporting subband is represented by using an information bit 1.

Optionally, a quantity of first information bits is the same as an actual quantity of reporting subbands, and the first information bits are used to indicate the reporting subband and the non-reporting subband or a quantity of first information bits is the same as a system-allowed maximum quantity of reporting subbands, and all or some of the first information bits are used to indicate the reporting subband and the non-reporting subband.

In a second possible design, the determining a quantity of channel state information subbands included in a channel state information reporting band, based on a CC bandwidth or the bandwidth part (BWP) bandwidth or a channel state information reference signal CSI-RS bandwidth, and the channel state information subband size, specifically includes: dividing a total quantity of resource blocks included in the CC bandwidth by the channel state information subband size and then calculate the least integer greater than or equal to the result of division, to obtain the quantity of channel state information subbands included in the channel state information reporting band; or dividing a total quantity of resource blocks included in the bandwidth part (BWP) bandwidth by the channel state information subband size and then calculate the least integer greater than or equal to the result of division, to obtain the quantity of channel state information subbands included in the channel state information reporting band; or dividing a total quantity of resource blocks included in the channel state information reference signal CSI-RS bandwidth by the channel state information subband size and then calculate the least integer greater than or equal to the result of division, to obtain the quantity of channel state information subbands included in the channel state information reporting band.

The channel state information subband in the channel state information reporting band includes the first channel state information subband, the last channel state information subband, and a normal channel state information subband.

The first channel state information subband may also be referred to as a starting channel state information subband or a start channel state information subband, and may be briefly referred to as a starting subband in this specification. The last channel state information subband may also be referred to as an ending channel state information subband or an end channel state information subband, and may be briefly referred to as an ending subband in this specification. The normal channel state information subband is a subband other than the first channel state information subband and the last channel state information subband in the channel state information subbands. The normal channel state information subband may also be referred to as a common channel state information subband, and may be briefly referred to as a common subband in this specification. Details are not described below again.

In a third possible design, a transmit end device determines an actual quantity of resource blocks included in the first channel state information subband and an actual quantity of resource blocks included in the last channel state information subband, and then sends receive end device. Specifically, the determining, by the transmit end device, an actual quantity of resource blocks included in the first channel state information subband includes determining that an actual quantity of resource blocks included in the first channel state information subband corresponding to the CC bandwidth in the channel state information reporting band=an actual quantity of resource blocks included in the normal channel state information subband−mod (an index number of an initial resource block in a CC, the actual quantity of resource blocks included in the normal channel state information subband) or determining that an actual quantity of resource blocks included in the first channel state information subband corresponding to the BWP in the channel state information reporting band=an actual quantity of resource blocks included in the normal channel state information subband−mod (an index number of an initial resource block in the BWP, the actual quantity of resource blocks included in the normal channel state information subband) or determining that an actual quantity of resource blocks included in the first channel state information subband corresponding to the CSI-RS bandwidth in the channel state information reporting band=an actual quantity of resource blocks included in the normal channel state information subband−mod (an index number of an initial resource block in a CSI-RS, the actual quantity of resource blocks included in the normal channel state information subband), where the actual quantity of resource blocks included in the first channel state information subband is less than or equal to the actual quantity of resource blocks included in the normal channel state information subband.

The determining, by the transmit end device, an actual quantity of resource blocks included in the last channel state information subband includes determining a resource block remainder, where the resource block remainder=mod ((the index number of the initial resource block in the CC+a total quantity of resource blocks included in the CC bandwidth), an actual quantity of resource blocks included in the normal channel state information subband); or determining a resource block remainder, where the resource block remainder=mod ((the index number of the initial resource block in the BWP+a total quantity of resource blocks included in the BWP), an actual quantity of resource blocks included in the normal channel state information subband) or determining a resource block remainder, where the resource block remainder=mod ((the index number of the initial resource block in the CSI-RS+a total quantity of resource blocks included in the CSI-RS bandwidth), an actual quantity of resource blocks included in the normal channel state information subband); and when the resource block remainder is greater than zero, the actual quantity of resource blocks included in the last channel state information subband=the resource block remainder; or when the resource block remainder is equal to zero, the actual quantity of resource blocks included in the last channel state information subband=the actual quantity of resource blocks included in the normal channel state information subband.

The actual quantity of resource blocks included in the normal channel state information subband is equal to the maximum quantity of resource blocks included in the channel state information subband.

In a fourth possible design, the transmit end device indicates the quantity of channel state information subbands to the terminal by using the reporting subband configuration information, and the receive end device determines, based on the channel state information subband size, an actual quantity of resource blocks included in the first channel state information subband and an actual quantity of resource blocks included in the last channel state information subband. Manners used by the receive end device for determining the actual quantity of resource blocks included in the first channel state information subband and determining the actual quantity of resource blocks included in the last channel state information subband are the same as those used by the transmit end device, and details are not described herein again.

In a fifth possible design, the reporting subband configuration information sent by the transmit end device to the receive end device further includes an actual quantity of resource blocks included in the first channel state information subband or the last channel state information subband; and the receive end device determines, based on the actual quantity of resource blocks included in the first channel state information subband or the last channel state information subband and the channel state information subband size, an index number of the resource block included in the first channel state information subband or the last channel state information subband.

In a sixth possible design, the method further includes reporting subband group configuration information sent by the transmit end device to the receive end device is used to indicate which subband group in the reporting band is a reporting subband group, so that the terminal determines at least one reporting subband group in the reporting band based on the reporting subband group configuration information.

In a seventh possible design, after the reporting subband configuration information indicating a reporting state or a non-reporting state of the channel state information subband is sent to the terminal by using the first information bit, the method further includes sending dynamic signaling to the terminal, where the dynamic signaling includes a third information bit, the third information bit is used to represent an index of the first information bit or a second information bit, and the third information bit is used to instruct the terminal to select, based on an indication of the index of the third information bit, a reporting subband or a non-reporting subband that is indicated by the first information bit or a reporting subband group or a non-reporting subband group that is indicated by the second information bit.

In the foregoing seven possible designs, the channel state information is one of the following information a channel quality indicator, a precoding matrix indicator, a rank indication, and a channel state information reference signal resource indicator.

According to a second aspect of the embodiments of the present application, a transmit end device is provided and includes a processing module and an interface, where the processing module is configured to determine a channel state information subband size based on a bandwidth part (BWP) bandwidth; and the processing module is further configured to determine, a quantity of channel state information subbands included in a channel state information reporting band, based on a CC bandwidth or the bandwidth part (BWP) bandwidth or a channel state information reference signal CSI-RS bandwidth, and the channel state information subband size.

In a first possible design, the transmit end device further includes a transceiver module, configured to send, to a receive end device, reporting subband configuration information indicating that each channel state information subband is a reporting subband or a non-reporting subband, where, in other words, the reporting subband configuration information is used to indicate which subband in the channel state information reporting band is a reporting subband and which subband is not a reporting subband; and the reporting subband configuration information is represented by using information bits, and a quantity of information bits is the same as the quantity of channel state information subbands.

In an implementation of the first possible design, the reporting subband configuration information indicates the quantity of channel state information subbands or further indicates a starting location of the channel state information subband or a starting location and an ending location of the channel state information subband.

The reporting subband configuration information includes a first information bit. The first information bit is used to indicate a reporting subband or a non-reporting subband in the channel state information subbands in the reporting band, that is, indicate which subband in the channel state information subbands is a reporting subband and which subband is a non-reporting subband. In other words, the reporting subband configuration information is implemented by using a bitmap.

Optionally, the channel state information subbands in the channel state information reporting band may be reporting subbands, or some of the channel state information subbands are reporting subbands and remaining channel state information subbands are non-reporting subbands. The reporting subband may be represented by using an information bit 1, and the non-reporting subband may be represented by using an information bit 0; or the reporting subband is represented by using an information bit 0, and the non-reporting subband is represented by using an information bit 1.

Optionally, a quantity of first information bits is the same as an actual quantity of reporting subbands, and the first information bits are used to indicate the reporting subband and the non-reporting subband or a quantity of first information bits is the same as a system-allowed maximum quantity of reporting subbands, and all or some of the first information bits are used to indicate the reporting subband and the non-reporting subband.

The channel state information subband size is a maximum quantity of resource blocks included in the channel state information subband, and the maximum quantity of resource blocks is determined by a total quantity of resource blocks included in the bandwidth part (BWP) bandwidth.

In a second possible design, the processing module is specifically configured to divide a total quantity of resource blocks included in the CC bandwidth by the channel state information subband size and round up, to obtain the quantity of channel state information subbands included in the channel state information reporting band, divide a total quantity of resource blocks included in the bandwidth part (BWP) bandwidth by the channel state information subband size and round up, to obtain the quantity of channel state information subbands included in the channel state information reporting band, or divide a total quantity of resource blocks included in the channel state information reference signal CSI-RS bandwidth by the channel state information subband size and round up, to obtain the quantity of channel state information subbands included in the channel state information reporting band.

The channel state information subband includes the first channel state information subband, the last channel state information subband, and a normal channel state information subband.

In a third possible design, the processing module of the transmit end device determines an actual quantity of resource blocks included in the first channel state information subband and an actual quantity of resource blocks included in the last channel state information subband, and then the transceiver module sends the actual quantity of resource blocks to the receive end device.

Specifically, the determining, by the processing module, an actual quantity of resource blocks included in the first channel state information subband includes determining, by the processing module, that an actual quantity of resource blocks included in the first channel state information subband corresponding to the CC bandwidth in the channel state information reporting band=an actual quantity of resource blocks included in the normal channel state information subband−mod (an index number of an initial resource block in a CC, the actual quantity of resource blocks included in the normal channel state information subband); or determining, by the processing module, that an actual quantity of resource blocks included in the first channel state information subband corresponding to the BWP in the channel state information reporting band=an actual quantity of resource blocks included in the normal channel state information subband−mod (an index number of an initial resource block in the BWP, the actual quantity of resource blocks included in the normal channel state information subband) or determining, by the processing module, that an actual quantity of resource blocks included in the first channel state information subband corresponding to the CSI-RS bandwidth in the channel state information reporting band=an actual quantity of resource blocks included in the normal channel state information subband−mod (an index number of an initial resource block in a CSI-RS, the actual quantity of resource blocks included in the normal channel state information subband), where the actual quantity of resource blocks included in the first channel state information subband is less than or equal to the actual quantity of resource blocks included in the normal channel state information subband.

That the processing module is further configured to determine an actual quantity of resource blocks included in the last channel state information subband includes determining a resource block remainder, where the resource block remainder=mod ((the index number of the initial resource block in the CC+a total quantity of resource blocks included in the CC bandwidth), an actual quantity of resource blocks included in the normal channel state information subband) or
determining a resource block remainder, where the resource block remainder=mod ((the index number of the initial resource block in the BWP+a total quantity of resource blocks included in the BWP), an actual quantity of resource blocks included in the normal channel state information subband) or determining a resource block remainder, where the resource block remainder=mod ((the index number of the initial resource block in the CSI-RS+a total quantity of resource blocks included in the CSI-RS bandwidth), an actual quantity of resource blocks included in the normal channel state information subband); and when the resource block remainder is greater than zero, the actual quantity of resource blocks included in the last channel state information subband=the resource block remainder; or when the resource block remainder is equal to zero, the actual quantity of resource blocks included in the last channel state information subband=the actual quantity of resource blocks included in the normal channel state information subband.

The actual quantity of resource blocks included in the normal channel state information subband is equal to the maximum quantity of resource blocks included in the channel state information subband.

In a fourth possible design, the transceiver module of the transmit end device indicates the quantity of channel state information subbands to the receive end device by using the reporting subband configuration information, and the receive end device determines, based on the channel state information subband size, an actual quantity of resource blocks included in the first channel state information subband and an actual quantity of resource blocks included in the last channel state information subband.

Manners used by the receive end device for determining the actual quantity of resource blocks included in the first channel state information subband and determining the actual quantity of resource blocks included in the last channel state information subband are the same as those used by the transmit end device, and details are not described herein again.

In a fifth possible design, the reporting subband configuration information sent by the transmit end device to the receive end device further includes an actual quantity of resource blocks included in the first channel state information subband or the last channel state information subband; and the receive end device determines, based on the actual quantity of resource blocks included in the first channel state information subband or the last channel state information subband and the channel state information subband size, an index number of the resource block included in the first channel state information subband or the last channel state information subband.

In a sixth possible design, reporting subband group configuration information sent by the transceiver module of the transmit end device to the terminal is further used to indicate which subband group in the reporting band is a reporting subband group, so that the terminal determines at least one reporting subband group in the reporting band based on the reporting subband group configuration information.

In a seventh possible design, after sending the reporting subband configuration information indicating a reporting state or a non-reporting state of the channel state information subband by using the first information bits to the terminal, the transceiver module of the transmit end device is further configured to send dynamic signaling to the terminal, where the dynamic signaling includes a third information bit, the third information bit is used to represent an index of the first information bit or a second information bit, and the third information bit is used to instruct the terminal to select, based on an indication of the index of the third information bit, a reporting subband or a non-reporting subband that is indicated by the first information bit or a reporting subband group or a non-reporting subband group that is indicated by the second information bit.

In the foregoing seven possible designs, the channel state information is one of the following information a channel quality indicator, a precoding matrix indicator, a rank indication, and a channel state information reference signal resource indicator.

According to a third aspect of the embodiments of the present application, a method for configuring a channel state information reporting band is provided and includes receiving reporting subband configuration information that indicates a channel state information subband and that is sent by a transmit end device, where the reporting subband configuration information indicates that the channel state information subband is a reporting subband or a non-reporting subband, and the channel state information subband belongs to the channel state information reporting band and determining a quantity of channel state information subbands based on the reporting subband configuration information.

The method for configuring a channel state information reporting band provided in the third aspect is performed by a receive end device. Specifically, the receive end device may be a terminal.

In a first possible design manner, the reporting subband configuration information is represented by using information bits, and a quantity of information bits is the same as the quantity of channel state information subbands included in the channel state information reporting band.

When receiving the reporting subband configuration information, the receive end device may learn of the quantity of information bits, to learn of the quantity of channel state information subbands included in the channel state information reporting band.

In a second possible design manner, the reporting subband configuration information includes a channel state information subband size. After receiving the reporting subband configuration information, the receive end device determines the quantity of channel state information subbands included in the channel state information reporting band, based on a CC bandwidth or a bandwidth part (BWP) bandwidth or a channel state information reference signal CSI-RS bandwidth, and the channel state information subband size. The channel state information subband size is a maximum quantity of resource blocks included in the channel state information subband.

Specifically, the determining, the quantity of channel state information subbands included in the channel state information reporting band, based on a CC bandwidth or a bandwidth part (BWP) bandwidth or a channel state information reference signal CSI-RS bandwidth, and the channel state information subband size includes dividing a total quantity of resource blocks included in the CC bandwidth by the channel state information subband size and then calculate the least integer greater than or equal to the result of division, to obtain the quantity of channel state information subbands included in the channel state information reporting band, or dividing a total quantity of resource blocks included in the bandwidth part (BWP) bandwidth by the channel state information subband size and then calculate the least integer greater than or equal to the result of division, to obtain the quantity of channel state information subbands included in the channel state information reporting band, or dividing a total quantity of resource blocks included in the channel state information reference signal CSI-RS bandwidth by the channel state information subband size and then calculate the least integer greater than or equal to the result of division, to obtain the quantity of channel state information subbands included in the channel state information reporting band.

The channel state information subband includes the first channel state information subband, the last channel state information subband, and a normal channel state information subband.

In a third possible design manner, the receive end device determines an actual quantity of resource blocks included in the first channel state information subband and an actual quantity of resource blocks included in the last channel state information subband.

Specifically, the determining an actual quantity of resource blocks included in the first channel state information subband includes determining that an actual quantity of resource blocks included in the first channel state information subband corresponding to the CC bandwidth in the channel state information reporting band=an actual quantity of resource blocks included in the normal channel state information subband−mod (an index number of an initial resource block in a CC bandwidth, the actual quantity of resource blocks included in the normal channel state information subband), or determining that an actual quantity of resource blocks included in the first channel state information subband corresponding to the BWP bandwidth in the channel state information reporting band=an actual quantity of resource blocks included in the normal channel state information subband−mod (an index number of an initial resource block in the BWP bandwidth, the actual quantity of resource blocks included in the normal channel state information subband), or determining that an actual quantity of resource blocks included in the first channel state information subband corresponding to the CSI-RS bandwidth in the channel state information reporting band=an actual quantity of resource blocks included in the normal channel state information subband−mod (an index number of an initial resource block in a CSI-RS bandwidth, the actual quantity of resource blocks included in the normal channel state information subband), where the actual quantity of resource blocks included in the first channel state information subband is less than or equal to the actual quantity of resource blocks included in the normal channel state information subband.

The determining an actual quantity of resource blocks included in the last channel state information subband includes determining a resource block remainder, where the resource block remainder=mod ((the index number of the initial resource block in the CC bandwidth+a total quantity of resource blocks included in the CC bandwidth), an actual quantity of resource blocks included in the normal channel state information subband), or determining a resource block remainder, where the resource block remainder=mod ((the index number of the initial resource block in the BWP bandwidth+a total quantity of resource blocks included in the BWP bandwidth), an actual quantity of resource blocks included in the normal channel state information subband), or determining a resource block remainder, where the resource block remainder=mod ((the index number of the initial resource block in the CSI-RS bandwidth+a total quantity of resource blocks included in the CSI-RS bandwidth), an actual quantity of resource blocks included in the normal channel state information subband); and when the resource block remainder is greater than zero, the actual quantity of resource blocks included in the last channel state information subband=the resource block remainder or the resource block remainder is equal to zero, the actual quantity of resource blocks included in the last channel state information subband=the actual quantity of resource blocks included in the normal channel state information subband.

In a fourth possible design manner, the reporting subband configuration information received by the terminal from a network device further includes an actual quantity of resource blocks included in the first channel state information subband or a last channel state information subband; and the terminal determines, based on the reporting subband configuration information and the channel state information subband size, an index number of the resource block included in the first channel state information subband or the last channel state information subband.

In the foregoing five possible designs, the actual quantity of resource blocks included in the normal channel state information subband is equal to the maximum quantity of resource blocks included in the channel state information subband.

In the foregoing five possible designs, the channel state information is one of the following information a channel quality indicator, a precoding matrix indicator, a rank indication, and a channel state information reference signal resource indicator.

According to a fourth aspect of the embodiments of the present application, a receive end device is provided and includes a transceiver module, configured to receive reporting subband configuration information that indicates a channel state information subband and that is sent by a transmit end device, where the reporting subband configuration information indicates that each channel state information subband is a reporting subband or a non-reporting subband, and the channel state information subband belongs to the channel state information reporting band; and a processing module, configured to determine, based on the reporting subband configuration information, a quantity of channel state information subbands included in the channel state information reporting band.

In a first possible design manner, the reporting subband configuration information received by the transceiver module is represented by using information bits, and a quantity of information bits is equal to the quantity of channel state information subbands included in the channel state information reporting band. When receiving the reporting subband configuration information, the receive end device learns of the quantity of information bits, to learn of the quantity of channel state information subbands included in the channel state information reporting band.

In a second possible design manner, the reporting subband configuration information includes a channel state information subband size. After the receive end device receives the reporting subband configuration information, the processing module of the receive end device determines, the quantity of channel state information subbands included in the channel state information reporting band, based on a CC bandwidth or a bandwidth part (BWP) bandwidth or a channel state information reference signal CSI-RS bandwidth, and the channel state information subband size. The channel state information subband size is a maximum quantity of resource blocks included in the channel state information subband.

Specifically, the determining, the quantity of channel state information subbands included in the channel state information reporting band by the processing module based on a CC bandwidth or a bandwidth part (BWP) bandwidth or a channel state information reference signal CSI-RS bandwidth, and the channel state information subband size, includes dividing, by the processing module, a total quantity of resource blocks included in the CC bandwidth by the channel state information subband size and then calculate the least integer greater than or equal to the result of division, to obtain the quantity of channel state information subbands included in the channel state information reporting band or dividing, by the processing module, a total quantity of resource blocks included in the bandwidth part (BWP) bandwidth by the channel state information subband size and then calculate the least integer greater than or equal to the result of division, to obtain the quantity of channel state information subbands included in the channel state information reporting band; or dividing, by the processing module, a total quantity of resource blocks included in the channel state information reference signal CSI-RS bandwidth by the channel state information subband size and then calculate the least integer greater than or equal to the result of division, to obtain the quantity of channel state information subbands included in the channel state information reporting band.

The channel state information subband includes the first channel state information subband, the last channel state information subband, and a normal channel state information subband.

In a third possible design manner, the processing module of the terminal determines an actual quantity of resource blocks included in the first channel state information subband and an actual quantity of resource blocks included in the last channel state information subband.

Specifically, the determining, by the processing module of the terminal, an actual quantity of resource blocks included in the first channel state information subband includes determining, by the processing module, that an actual quantity of resource blocks included in the first channel state information subband corresponding to the CC bandwidth in the channel state information reporting band=an actual quantity of resource blocks included in the normal channel state information subband−mod (an index number of an initial resource block in a CC, the actual quantity of resource blocks included in the normal channel state information subband); or determining, by the processing module, that an actual quantity of resource blocks included in the first channel state information subband corresponding to the BWP in the channel state information reporting band=an actual quantity of resource blocks included in the normal channel state information subband−mod (an index number of an initial resource block in the BWP, the actual quantity of resource blocks included in the normal channel state information subband); or determining, by the processing module, that an actual quantity of resource blocks included in the first channel state information subband corresponding to the CSI-RS bandwidth in the channel state information reporting band=an actual quantity of resource blocks included in the normal channel state information subband−mod (an index number of an initial resource block in a CSI-RS, the actual quantity of resource blocks included in the normal channel state information subband), where the actual quantity of resource blocks included in the first channel state information subband is less than or equal to the actual quantity of resource blocks included in the normal channel state information subband.

The determining, by the processing module, an actual quantity of resource blocks included in the last channel state information subband includes determining a resource block remainder, where the resource block remainder=mod ((the index number of the initial resource block in the CC+a total quantity of resource blocks included in the CC bandwidth), an actual quantity of resource blocks included in the normal channel state information subband), or determining a resource block remainder, where the resource block remainder=mod ((the index number of the initial resource block in the BWP+a total quantity of resource blocks included in the BWP), an actual quantity of resource blocks included in the normal channel state information subband), or determining a resource block remainder, where the resource block remainder=mod ((the index number of the initial resource block in the CSI-RS+a total quantity of resource blocks included in the CSI-RS bandwidth), an actual quantity of resource blocks included in the normal channel state information subband); and when the resource block remainder is greater than zero, the actual quantity of resource blocks included in the last channel state information subband=the resource block remainder; or when the resource block remainder is equal to zero, the actual quantity of resource blocks included in the last channel state information subband=the actual quantity of resource blocks included in the normal channel state information subband.

In a fourth possible design manner, the reporting subband configuration information received by the transceiver module of the terminal from the transmit end device further includes the actual quantity of resource blocks included in the first channel state information subband or the last channel state information subband; and the processing module of the terminal determines, based on the reporting subband configuration information and the channel state information subband size, an index number of the resource block included in the first channel state information subband or the last channel state information subband.

In the foregoing five possible designs, the actual quantity of resource blocks included in the normal channel state information subband is equal to the maximum quantity of resource blocks included in the channel state information subband.

In the foregoing five possible designs, the channel state information is one of the following information a channel quality indicator, a precoding matrix indicator, a rank indication, and a channel state information reference signal resource indicator.

In a possible design, the channel state information is one of the following information a channel quality indicator, a precoding matrix indicator, a rank indication, and a channel state information reference signal resource indicator.

In a possible design, the processing module is a processor, and the transceiver module is a transceiver.

According to a fifth aspect of the embodiments of the present application, a processor is provided. The processor is configured to perform any of the foregoing methods, and it should be understood that steps related to transmitting and receiving are performed by the processor by using a transceiver.

According to a sixth aspect of the embodiments of the present application, a processing apparatus is provided and includes a memory, and a processor, configured to read an instruction stored in the memory to perform any of the foregoing methods, where it should be understood that steps related to transmitting and receiving are performed by the processor by using a transceiver.

The memory may be a non-transitory memory such as a read-only memory (ROM). The memory and the processor may be integrated on a same chip or may be separately disposed on different chips. A type of the memory and setting manners of the memory and the processor are not limited in this embodiment of the present application.

According to a seventh aspect of the embodiments of the present application, a chip is provided and includes a processor, configured to read an instruction stored in a memory to perform any of the foregoing methods, where it should be understood that steps related to transmitting and receiving are performed by the processor by using a transceiver.

According to an eighth aspect of the embodiments of the present application, a computer readable storage medium is provided and includes an instruction, and when the instruction is run on a computer, the computer is caused to perform any of the foregoing methods.

The computer readable storage medium is non-transitory.

According to a ninth aspect of the embodiments of the present application, a computer program product including an instruction is provided. When the instruction is run on a computer, the computer is caused to perform any of the foregoing methods.

Beneficial effects of the embodiments of the present application are that, compared with the prior art that a quantity of CSI reporting subbands can be configured based on only a system bandwidth, the quantity of channel state information subbands included in the channel state information reporting band may be configured based on the CC bandwidth or the bandwidth part (BWP) bandwidth or the channel state information reference signal CSI-RS bandwidth during CSI configuration, so that the embodiments of the present application can better satisfy a requirement of a new generation communications network.

BRIEF DESCRIPTION OF DRAWINGS

FIG. 7 is a schematic diagram of channel state information configuration according to another embodiment of the present application;

FIG. 10 is a schematic diagram of channel state information configuration according to another embodiment of the present application;

FIG. 11 is a schematic diagram of channel state information configuration according to another embodiment of the present application;

FIG. 13 is a schematic diagram of channel state information configuration according to another embodiment of the present application;

DESCRIPTION OF EMBODIMENTS

Currently, a next-generation wireless communications system in a research and development phase is also referred to as new radio (NR) system or a 5G system. Latest research progress of a next-generation wireless communications standard indicates that CSI may be sent from a receive end device to a transmit end device by using a physical uplink shared channel (PUSCH). A person skilled in the art should understand that compared with a physical uplink control channel (PUCCH) mainly used to transmit control information, the PUSCH is mainly used to transmit data. Therefore, during CSI transmission, the PUSCH may further transmit data or may not transmit data. For example, a PUSCH in an uplink subframe may transmit both CSI and data, or may transmit only CSI but do not transmit data. The CSI is usually included in uplink control information (UCI), and the UCI is transmitted by using the PUSCH. The UCI may further include at least two parts. A quantity of information bits included in a first part is fixed, and the first part is used to indicate a quantity of information bits in a second part. In addition, a priority of the first part is higher than that of the second part. Further, the first part and the second part may be separately encoded. A person skilled in the art should understand that a finally determined next-generation wireless communications standard may also change and may be different from the foregoing latest research progress.

Figure 1:
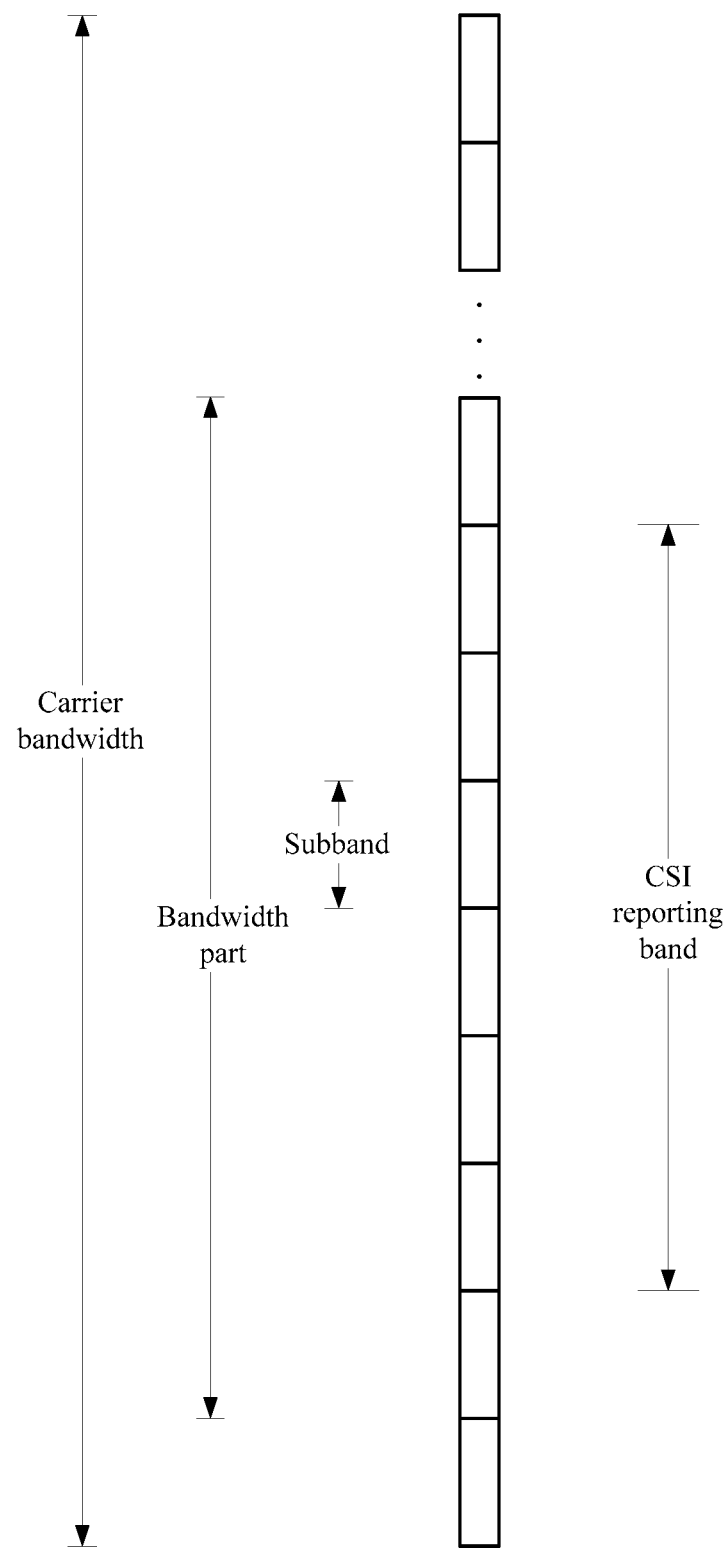
FIG. 1 is a schematic diagram of band division according to an embodiment of the present application.

FIG. 1 is a schematic diagram of band division according to an embodiment of the present application. As shown in FIG. 1, a CC bandwidth may be considered as a wideband, and the carrier bandwidth further includes at least one bandwidth part (BWP) bandwidth. Each bandwidth part includes at least one contiguous subband, and each subband further includes a plurality of contiguous subcarriers.

Each bandwidth part may correspond to a group of system parameters (e.g., numerology), including, for example, but not limited to, a subcarrier spacing and a cyclic prefix (CP). Different bandwidth parts may correspond to different system parameters. Optionally, within a same transmission time interval (TTI), in a plurality of bandwidth parts, only one bandwidth part may be available and other bandwidth parts are unavailable.

During CSI reporting, some or all of the subbands in the bandwidth part may be used as a CSI reporting band, to report CSI corresponding to the CSI reporting band. For ease of description, the CSI reporting band is briefly referred to as a reporting band below. It should be understood that the reporting band is a bandwidth, CSI corresponding to the bandwidth needs to be reported, and the bandwidth includes a plurality of subbands. A reference signal that is used for channel measurement and that is transmitted by a transmit end device is carried on the reporting band. The reference signal is, for example, but not limited to, a cell-specific reference signal (CRS), a channel state information reference signal (CSI-RS), or a demodulation reference signal (DMRS). Technical content related to the foregoing reference signal belongs to the prior art, and is not limited in this embodiment of the present application. A receive end device may measure the foregoing reference signal to obtain corresponding CSI. During CSI reporting, the CSI corresponding to the entire reporting band, i.e., wideband CSI corresponding to the reporting band, may be reported; or CSI corresponding to at least one subband within the reporting band may be reported; or the foregoing two reporting manners may be combined; or another reporting manner may be used. As shown in FIG. 1, the reporting band includes a plurality of contiguous subbands. However, in a specific implementation process, subbands included in a reporting band may be non-contiguous. For example, a bandwidth part includes six contiguous subbands, a subband 1 to a subband 6, and the reporting band may include the subband 1, the subband 2, the subband 4, and the subband 6. In a specific implementation process, the band may also be divided in another manner or hierarchy. For example, in different division manners, quantities of subcarriers included in subbands may be different. For another example, at least one level may be added or deleted between band division levels shown in FIG. 1. A specific band division manner is not limited in this embodiment of the present application.

In channel measurement, the receive end device obtains channel state information based on a reference signal (RS) transmitted by the transmit end device, and feeds back the obtained CSI to the transmit end device. The transmit end device may process a signal based on the CSI and sends the processed signal to the receive end device. In a specific implementation process, the CSI may further include, for example, but is not limited to, at least one of the following information: a channel quality indicator (CQI), a precoding matrix indicator (PMI), a CSI-RS resource indicator (CRI), and a rank indication (RI). When processing the signal, the transmit end device may process the signal by using the CSI fed back by the receive end device; or the transmit end device may adjust the CSI fed back by the receive end device, and process the signal by using the adjusted CSI. For example, in a specific implementation process, the transmit end device may decrease the RI fed back by the receive end device, and process the transmit signal by using a decreased RI. For another example, the transmit end device may also reconstruct a precoding matrix corresponding to the PMI fed back by the receive end device, and process the signal by using a reconstructed PMI. A reconstruction process may be, for example, but not limited to, performing orthogonalization on precoding matrices corresponding to PMIs fed back by a plurality of simultaneously scheduled receive end devices. A method for simultaneously scheduling a plurality of receive end devices for data transmission is also referred to as a multi-user multiple-input multiple-output (MU-MIMO) technology. For another example, the transmit end device may also decrease the CQI fed back by the receive end device, and process the transmit signal by using a decreased CQI. It should be noted that if the transmit end device adjusts the CSI fed back by the receive end device, the transmit end device may need to notify the receive end device of the adjusted CSI, so that the receive end device restores the transmit signal from a received signal based on the adjusted CSI. For example, if a base station adjusts an RI or a CQI, the base station needs to notify the receive end device of an adjusted RI or an adjusted CQI. In a specific implementation process, a specific manner of adjusting, by the transmit end device, the CSI fed back by the receive end device is not limited in this embodiment of the present application.

In LTE, configurations for the subbands in the foregoing channel state information reporting band (CSI reporting band) are shown in Table 1 and Table 2. The subband is configured based on a system bandwidth. Different system bandwidth ranges correspond to different subband sizes. Therefore, a quantity of subbands in a corresponding system bandwidth may be derived based on the subband size.

TABLE 1

Subband size and system bandwidth
(Subband Size (k) vs. System Bandwidth)

| System Bandwidth $D_{RB}^{DL}$ | Subband Size (k) |
|---|---|
| 6-7 | N/A |
| 8-10 | 4 |
| 11-26 | 4 |
| 27-63 | 6 |
| 64-110 | 8 |

TABLE 2

Subband size and a quantity of subbands in a
downlink system bandwidth (Subband Size (k) and
Number of Subbands (M) vs. Downlink System Bandwidth)

| System Bandwidth $N_{RB}^{DL}$ | Subband Size k (RBs) | M |
|---|---|---|
| 6-7 | N/A | N/A |
| 8-10 | 2 | 1 |
| 11-26 | 2 | 3 |
| 27-63 | 3 | 5 |
| 64-110 | 4 | 6 |

However, as described above, in a new radio (NR) system or a 5G system, a BWP, a CSI-RS band, and a CSI reporting band may be flexibly configured as a partial bandwidth or a full bandwidth. Consequently, a quantity of channel state information reporting subbands included in a channel state information reporting band is not determined by a system bandwidth any more. How to determine a quantity of channel state information reporting subbands in a new radio (NR) system or a 5G system is a technical problem to be urgently resolved. Based on this, this application provides a channel state information reporting band configuration and reporting method and a corresponding apparatus, to satisfy a network evolution requirement.

The technical solutions provided in the embodiments of the present application are described in detail with reference to the accompanying drawings and specific embodiments.

Figure 2:
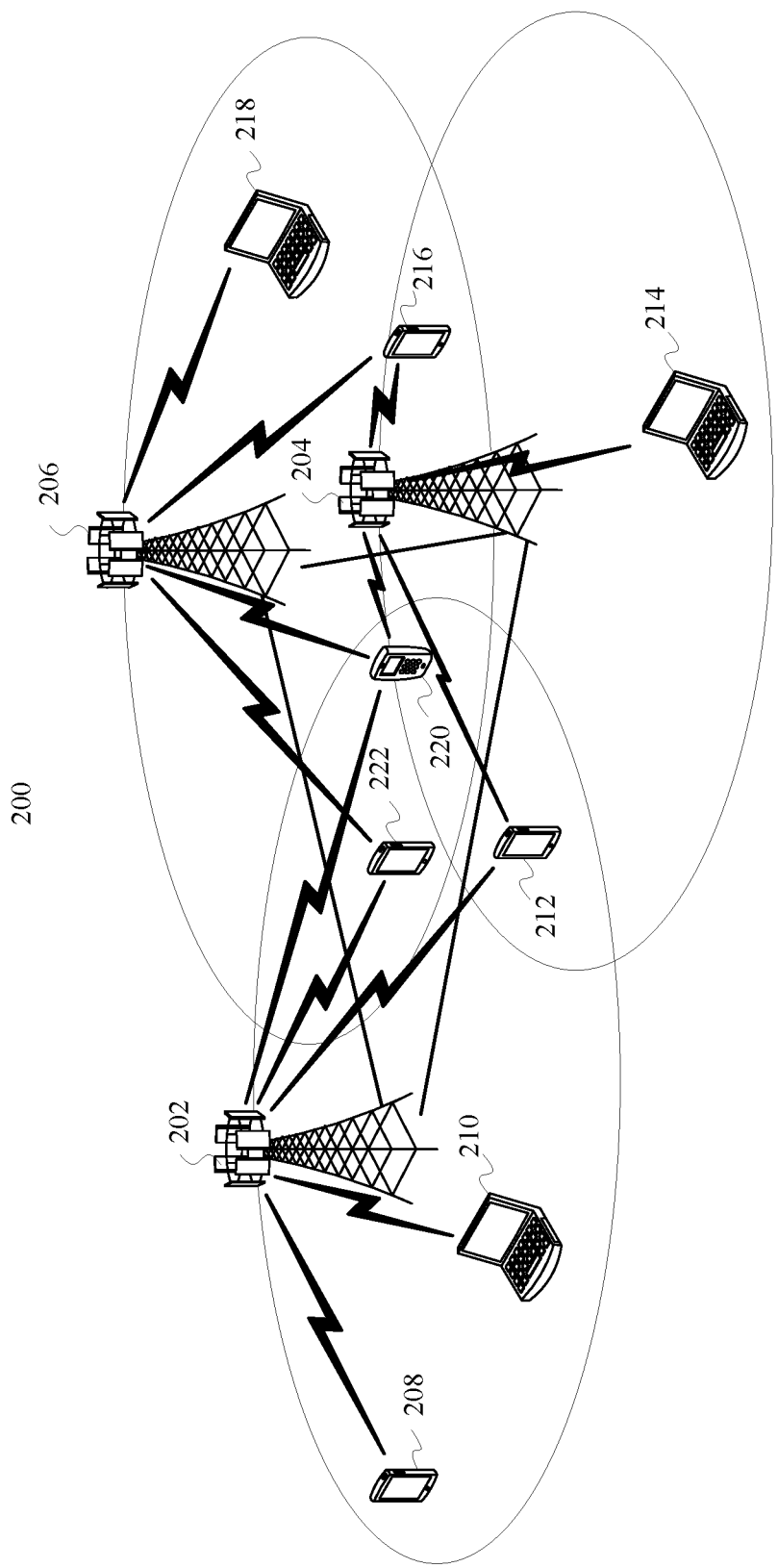
FIG. 2 is a schematic diagram of a wireless communications network according to an embodiment of the present application.

FIG. 2 is a schematic diagram of an example of a wireless communications network 200 according to an embodiment of the present application. As shown in FIG. 2, the wireless communications network 200 includes base stations 202 to 206 and terminal devices 208 to 222. The base stations 202 to 206 may communicate with each other by using backhaul links (as shown by straight lines between the base stations 202 to 206). The backhaul link may be a wired backhaul link (such as an optical fibre or a copper cable), or may be a wireless backhaul link (such as a microwave). The terminal devices 208 to 222 may communicate with the corresponding base stations 202 to 206 by using radio links (as shown by z-shaped lines between the base stations 202 to 206 and the terminal devices 208 to 222).

The base stations 202 to 206 are usually used as access devices to provide radio access services to the terminal devices 208 to 222 that are usually used as user equipment. Specifically, each base station corresponds to a service coverage area (which may also be referred to as a cell, as shown by each elliptical area in FIG. 2). The terminal device entering the area may communicate with the base station by using a radio signal, to receive a radio access service provided by the base station. There may be an overlapping area between service coverage areas of the base stations, and the terminal device within the overlapping area may receive radio signals from a plurality of base stations. Therefore, the base stations may coordinate with each other to serve the terminal device. For example, the plurality of base stations may serve the terminal device within the overlapping area by using a coordinated multipoint (CoMP) transmission/reception technology. For example, as shown in FIG. 2, there is an overlapping area between service coverage areas of the base station 202 and the base station 206, and the terminal device 222 is within the overlapping area, so that the terminal device 222 may receive radio signals from the base station 202 and the base station 204. The base station 202 and the base station 204 may coordinate with each other to serve the terminal device 222. For another example, as shown in FIG. 2, there is a common overlapping area between service coverage areas of the base station 202, the base station 204, and the base station 206, and the terminal device 220 is within the overlapping area, so that the terminal device 220 may receive radio signals from the base station 202, the base station 204, and the base station 206. The base station 202, the base station 204, and the base station 206 may coordinate with each other to serve the terminal device 220.

The base station may also be referred to as a NodeB, an evolved NodeB (eNodeB), an access point (AP), and the like depending on used wireless communications technologies. In addition, according to a size of a provided service coverage area, the base station may be classified into a macro base station used to provide a macro cell, a pico base station used to provide a pico cell, and a femto base station used to provide a femto cell, and the like. With continuous evolution of wireless communications technologies, another name may also be used for a future base station.

The terminal devices 208 to 222 may be various wireless communications devices having a wireless communications function, for example, but are not limited to, a mobile cellular phone, a cordless telephone set, a personal digital assistant (PDA), a smartphone, a notebook computer, a tablet computer, a wireless data card, a wireless modem (Modem), or a wearable device such as a smartwatch. With rise of Internet of Things (IoT) technologies, wireless communications units start to be configured for a growing number of devices that do not have the communications function before, which are, for example, but not limited to, household appliances, transportation means, tool devices, service devices, and service facilities, to obtain the wireless communications function, thereby accessing a wireless communications network and receiving remote control. Because the wireless communications units are configured for these types of devices, these types of devices have the wireless communications function. Therefore, these types of devices also belong to the scope of wireless communications devices. In addition, the terminal devices 208 to 222 may also be referred to as mobile stations, mobile devices, mobile terminals, wireless terminals, handheld devices, clients, and the like.

A plurality of antennas may be configured for both the base stations 202 to 206 and the terminal devices 208 to 222, to support a multiple-input multiple-output(MIMO) technology. Further, the base stations 202 to 206 and the terminal devices 208 to 222 may support both a single-user MIMO (SU-MIMO) technology and a multi-user MIMO (MU-MIMO). The MU-MIMO may be implemented based on a space division multiple access (SDMA) technology. Due to configuration of multiple antennas, the base stations 202 to 206 and the terminal devices 208 to 222 may further flexibly support a single-input single-output (Single Input Single Output, SISO) technology, a single-input multiple-output (SIMO) technology, and a multiple-input-single-output (MISO) technology, to implement various diversity (for example, but not limited to, a transmit diversity and a receive diversity) and multiplexing technologies. The diversity technology may include, but is not limited to, a transmit diversity (TD) technology and a receive diversity (RD) technology. The multiplexing technology may be a spatial multiplexing technology. In addition, the foregoing various technologies may further include a plurality of implementations. For example, the transmit diversity technology may include, for example, but is not limited to, a diversity manner such as a space time transmit diversity (STTD), a space-frequency transmit diversity (SFTD), a time switched transmit diversity (TSTD), a frequency switched transmit diversity (FSTD), an orthogonal transmit diversity (OTD), or a cyclic delay diversity (CDD), and diversity manners obtained after derivation, evolution, and combination of the foregoing various diversity manners. For example, transmit diversity manners such as space time block coding (STBC), space frequency block coding (SFBC), and CDD are used in a current Long Term Evolution (LTE) standard. Generic descriptions for the transmit diversity are provided above by using examples. A person skilled in the art should understand that in addition to the foregoing instances, the transmit diversity further includes a plurality of other implementations. Therefore, the foregoing descriptions should not be construed as a limitation to the technical solutions of the present application, and the technical solutions of the present application should be construed as being applicable to various possible transmit diversity solutions.

In addition, the base stations 202 to 206 and the terminal devices 208 to 222 may communicate with each other by using various wireless communications technologies. The various wireless communications technologies are, for example, but not limited to, a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an orthogonal frequency division multiple access (OFDMA) technology, a single carrier frequency division multiple access (SC-FDMA) technology, a space division multiple access (SDMA) technology, and evolved and derived technologies of these technologies. As radio access technologies (RAT), the foregoing wireless communications technologies are used in various wireless communications standards, so that various well-known wireless communications systems (or networks) today are constructed. These wireless communications systems include, but are not limited to, the Global System for Mobile Communications (GSM), CDMA 2000, wideband CDMA (WCDMA), WiFi defined in an 802.22 family standard, Worldwide Interoperability for Microwave Access (WiMAX), Long Term Evolution (LTE), LTE-Advanced (LTE-A), and evolved systems of these wireless communications systems. Unless particularly noted, the technical solutions provided in the embodiments of the present application are applicable to the foregoing various wireless communications technologies and wireless communications systems. In addition, the terms "system" and "network" may be interchanged.

It should be noted that the wireless communications network 200 shown in FIG. 2 is merely used as an example, but is not intended to limit the technical solutions of the present application. A person skilled in the art should understand that in a specific implementation process, the wireless communications network 200 may further include another device, and a quantity of base stations and a quantity of terminal devices may further be configured based on a specific requirement.

In a specific implementation process, access devices such as the base stations 202 to 206 shown in FIG. 2 may be used as transmit end devices, and user equipment such as the terminal devices 208 to 222 shown in FIG. 2 may be used as receive end devices.

Figure 3:
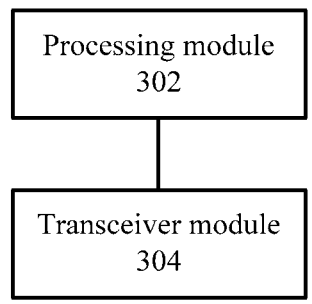
FIG. 3 is a schematic diagram of a logical structure of a communications device according to an embodiment of the present application.

FIG. 3 is a schematic diagram of an example of a logical structure of a communications device 300 according to an embodiment of the present application. The communications device 300 may be configured to implement a receive end device, or may be configured to implement a transmit end device. As shown in FIG. 3, the communications device 300 includes a processing module 302 and a transceiver module 304. Specific functions of the modules are described below in detail. In a specific implementation process, the processing module 302 may be implemented by a processor 402 in a communications device 400 described below, or may be implemented by the processor 402 and a memory 408 in the communications device 400, or certainly may be implemented in another manner. Similarly, the transceiver module 304 may be implemented by a transceiver 404 in the communications device 400, or certainly may be implemented in another manner.

Figure 4:
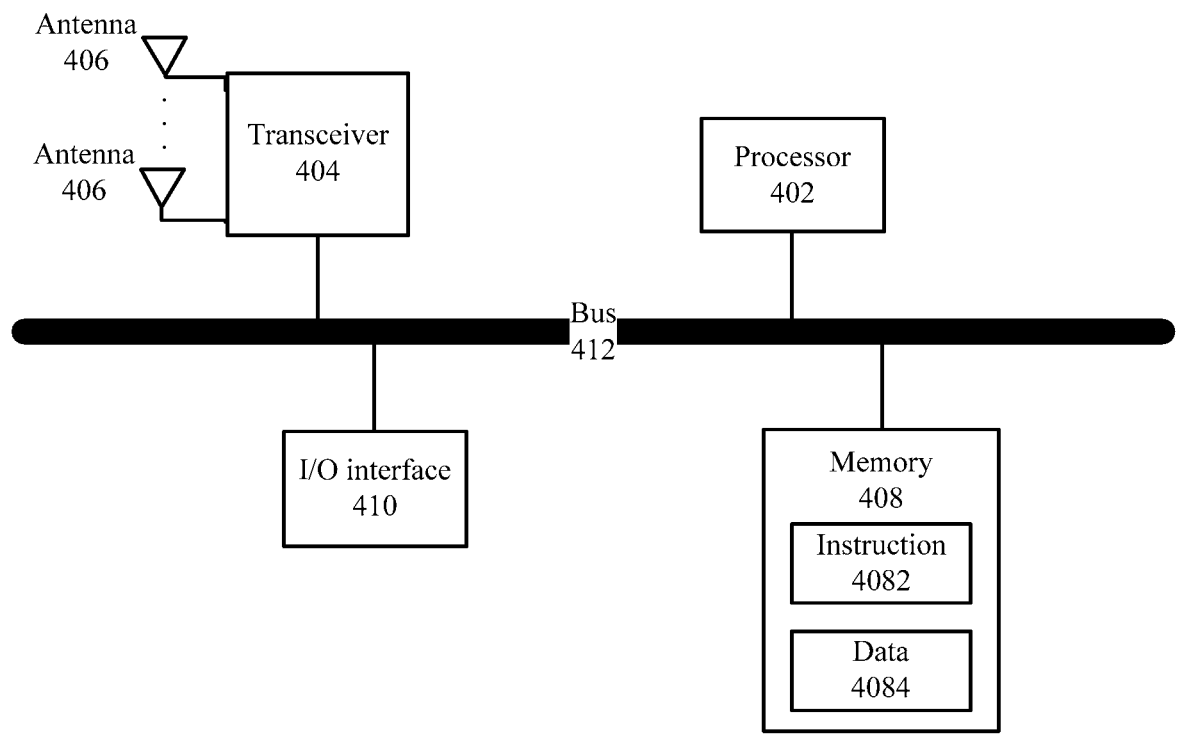
FIG. 4 is a schematic diagram of a hardware structure of a communications device according to an embodiment of the present application.

FIG. 4 is a schematic diagram of an example of a hardware structure of a communications device 400 according to an embodiment of the present application. The communications device 400 may be configured to implement a receive end device, or may be configured to implement a transmit end device. As shown in FIG. 4, the communications device 400 includes a processor 402, a transceiver 404, a plurality of antennas 406, a memory 408, an input/output (I/O) interface 410, and a bus 412. The memory 408 is further configured to store an instruction 4082 and data 4084. In addition, the processor 402, the transceiver 404, the memory 408, and the I/O interface 410 are communicatively connected to each other by using the bus 412, and the plurality of antennas 406 are connected to the transceiver 404. In a specific implementation process, in addition to the bus 412, the processor 402, the transceiver 404, the memory 408, and the I/O interface 410 may be communicatively connected to each other in another connection manner.

The processor 402 may be a general-purpose processor. The general-purpose processor may be a processor that performs a particular step and/or operation by reading and executing an instruction (such as the instruction 4082) stored in a memory (such as the memory 408). In a process in which the general-purpose processor performs the foregoing step and/or operation, data (such as the data 4084) stored in the memory (such as the memory 408) may be used. The general-purpose processor may be, for example, but not limited to, a central processing unit (CPU). In addition, the processor 402 may be a special-purpose processor. The special-purpose processor may be a processor specially designed to perform a particular step and/or operation. The special-purpose processor may be, for example, but not limited to, a digital signal processor (DSP), an application-specific integrated circuit (ASIC), and a field programmable gate array (FPGA). In addition, the processor 402 may be a combination of a plurality of processors, for example, a multi-core processor.

The transceiver 404 is configured to receive and send a signal. A specific process of signal receiving and sending is performed by using at least one of the plurality of antennas 406.

The memory 408 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 408 is specifically configured to store the instruction 4082 and the data 4084. When the processor 402 is a general-purpose processor, the processor 402 may perform a particular step and/or operation by reading and executing the instruction 4082 stored in the memory 408. In a process of performing the foregoing step and/or operation, the data 4084 may need to be used.

The I/O interface 410 is configured to: receive an instruction and/or data from a peripheral device, and output an instruction and/or data to a peripheral device.

In a specific implementation process, the processor may be configured to perform, for example, but not limited to, baseband-related processing. The transceiver may be configured to perform, for example, but not limited to, radio frequency receiving and sending. The foregoing devices may be separately disposed on mutually independent chips. Alternatively, at least some or all of the devices may be disposed on a same chip. For example, the processor may further be classified into an analog baseband processor and a digital baseband processor. The analog baseband processor and the transceiver may be integrated on a same chip. The digital baseband processor may be disposed on an independent chip. With continuous development of integrated circuit technologies, more devices can be integrated on a same chip. For example, the digital baseband processor and a plurality of application processors (for example, but not limited to, an image processor and a multimedia processor) may be integrated on a same chip. Such a chip may be referred to as a system on chip. Whether the devices are independently disposed on different chips or integrally disposed on one or more chips depends on a specific requirement of a product design. Specific implementation forms of the foregoing components are not limited in this embodiment of the present application.

It should be noted that in a specific implementation process, the communications device 400 may further include other hardware devices, and the other hardware devices are not listed in this specification one by one.

Specific functions of the hardware devices in the communications device 400 are described below in detail.

Figure 5:
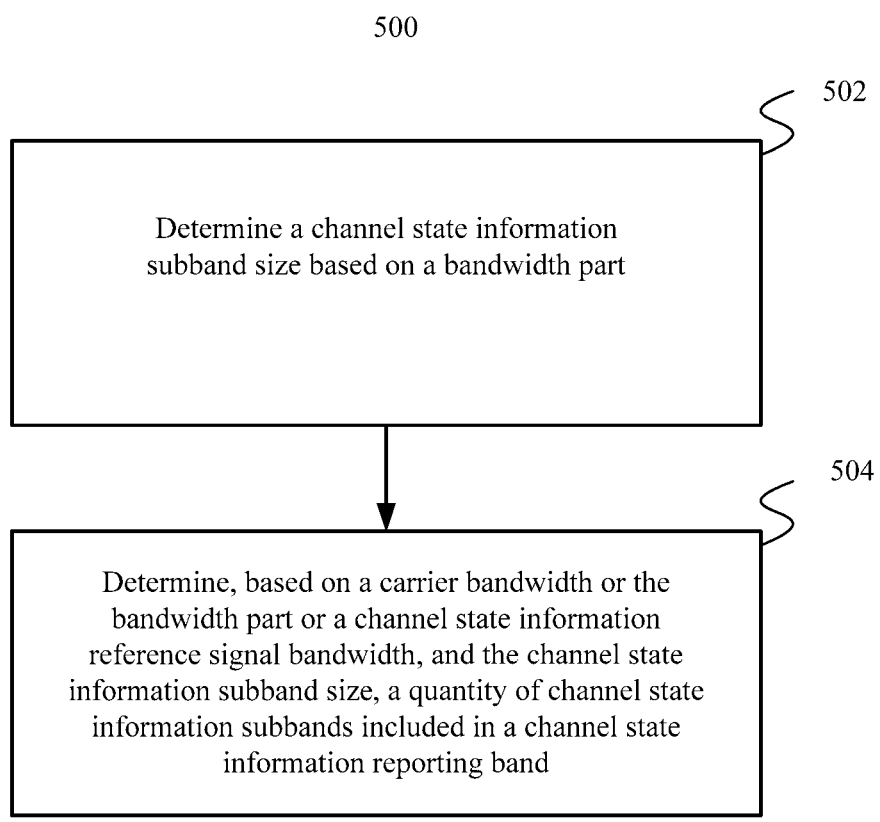
FIG. 5 is a flowchart of a channel state information configuration method according to an embodiment of the present application.

FIG. 5 is a flowchart of an example of a method 500 for configuring a channel state information reporting band according to an embodiment of the present application. In a specific implementation process, the method 500 may be performed by a transmit end device or a receive end device. The transmit end device or the receive end device may be implemented by the communications device 300 shown in FIG. 3 and the communications device 400 shown in FIG. 4.

In the method 500 provided in this embodiment, the transmit end device may be a network device or a terminal. In other words, the method procedure provided in this application may be implemented by a network device or a terminal. The network device may first configure a subband size, a quantity of subbands, a starting location, an ending location, and the like that are included in a CSI reporting band, and then indicate the information to the terminal. The terminal may configure, by itself based on the method, a subband size, a quantity of subbands, a starting location, and an ending location that are included in a CSI reporting band, and send the information to the network device as a configuration suggestion.

Step 502: Determine a channel state information subband size based on a bandwidth part (BWP) bandwidth.

Step 504: Determine a quantity of channel state information subbands included in a channel state information reporting band based on a carrier bandwidth (CC) bandwidth or the bandwidth part BWP or a channel state information reference signal (CSI-RS) bandwidth, and the channel state information subband size.

In a specific implementation process, step 502 and step 504 may be performed by the processing module 302 and the processor 402.

The channel state information subband size is a maximum quantity of resource blocks included in the channel state information subband, and the maximum quantity of resource blocks is determined by a total quantity of resource blocks included in the bandwidth part (BWP) bandwidth.

Specifically, the channel state information subband size is determined based on the following Table 3:

TABLE 3

| CC bandwidth part<br>(CC bandwidth part (PRBs)) | Subband Size<br>(Subband Size (PRBs)) |
|---|---|
| <24 | N/A |
| 24-72 | 4, 8 |
| 73-144 | 8, 16 |
| 145-275 | 16, 32 |

For example, when a total quantity of resource blocks (PRBs) in the CC bandwidth part, briefly referred to as the bandwidth part (BWP) bandwidth, is less than or equal to 24, there is no divided CSI subband; or when a total quantity of PRBs in the BWP is 24 to 72, the CSI subband size is 4 or 8; or when a total quantity of PRBs in the BWP is 73 to 144, the CSI subband size is 8 or 16; or when a total quantity of PRBs in the BWP is 145 to 275, the CSI subband size is 16 or 32.

In the method 500, the channel state information may be, for example, but not limited to, one of CQI, PMI, RI, and CRI. It should be noted that in a specific implementation process, the transmit end device may configure various types of channel state information for the receive end device. Alternatively, the receive end device may configure various types of channel state information by itself. Each type of channel state information may be configured with reference to the method 500. The receive end device may feed back the various types of channel state information of the channel state information subband to the transmit end device.

In step 504, the determining, a quantity of channel state information subbands included in a channel state information reporting band based on a CC bandwidth or the bandwidth part (BWP) bandwidth or a channel state information reference signal CSI-RS bandwidth, and the channel state information subband size, specifically includes: dividing a total quantity of resource blocks included in the CC bandwidth by the channel state information subband size and then calculate the least integer greater than or equal to the result of division, to obtain the quantity of channel state information subbands included in the channel state information reporting band, or dividing a total quantity of resource blocks included in the bandwidth part (BWP) bandwidth by the channel state information subband size and then calculate the least integer greater than or equal to the result of division, to obtain the quantity of channel state information subbands included in the channel state information reporting band, or dividing a total quantity of resource blocks included in the channel state information reference signal CSI-RS bandwidth by the channel state information subband size and then calculate the least integer greater than or equal to the result of division, to obtain the quantity of channel state information subbands included in the channel state information reporting band.

The channel state information subband includes the first channel state information subband, the last channel state information subband, and a normal channel state information subband.

The first channel state information subband may also be referred to as a starting channel state information subband or a start channel state information subband, and may be briefly referred to as a starting subband in this specification. The last channel state information subband may also be referred to as an ending channel state information subband or an end channel state information subband, and may be briefly referred to as an ending subband in this specification. The normal channel state information subband is a subband other than the first channel state information subband and the last channel state information subband in the channel state information subbands. The normal channel state information subband may also be referred to as a common channel state information subband, and may be briefly referred to as a common subband in this specification. Details are not described below again.

In an implementation, the transmit end device or the receive end device may determine an actual quantity of resource blocks included in the first channel state information subband and an actual quantity of resource blocks included in the last channel state information subband.

In another implementation, the transmit end device determines an actual quantity of resource blocks included in the first channel state information subband and an actual quantity of resource blocks included in the last channel state information subband, and then sends the actual quantity of resource blocks to the receive end device.

The determining an actual quantity of resource blocks included in the first channel state information subband includes determining that an actual quantity of resource blocks included in the first channel state information subband corresponding to the CC bandwidth in the channel state information reporting band=an actual quantity of resource blocks included in the normal channel state information subband−mod (an index number of an initial resource block in a CC bandwidth, the actual quantity of resource blocks included in the normal channel state information subband), or determining that an actual quantity of resource blocks included in the first channel state information subband corresponding to the BWP bandwidth in the channel state information reporting band=an actual quantity of resource blocks included in the normal channel state information subband−mod (an index number of an initial resource block in the BWP bandwidth, the actual quantity of resource blocks included in the normal channel state information subband), or determining that an actual quantity of resource blocks included in the first channel state information subband corresponding to the CSI-RS bandwidth in the channel state information reporting band=an actual quantity of resource blocks included in the normal channel state information subband−mod (an index number of an initial resource block in a CSI-RS bandwidth, the actual quantity of resource blocks included in the normal channel state information subband), where the actual quantity of resource blocks included in the first channel state information subband is less than or equal to the actual quantity of resource blocks included in the normal channel state information subband.

The method further includes: the determining an actual quantity of resource blocks included in the last channel state information subband is specifically determining an actual quantity of resource blocks included in the last channel state information subband corresponding to the CC bandwidth in the channel state information reporting band determining a resource block remainder, where the resource block remainder=mod ((the index number of the initial resource block in the CC bandwidth+a total quantity of resource blocks included in the CC bandwidth), an actual quantity of resource blocks included in the normal channel state information subband); and when the resource block remainder is greater than zero, the actual quantity of resource blocks included in the last channel state information subband corresponding to the CC bandwidth in the channel state information reporting band=the resource block remainder or when the resource block remainder is equal to zero, the actual quantity of resource blocks included in the last channel state information subband corresponding to the CC bandwidth in the channel state information reporting band=the actual quantity of resource blocks included in the normal channel state information subband.

Alternatively, determining an actual quantity of resource blocks included in the last channel state information subband corresponding to the BWP bandwidth in the channel state information reporting band includes determining a resource block remainder, where the resource block remainder=mod ((the index number of the initial resource block in the BWP bandwidth+a total quantity of resource blocks included in the BWP bandwidth), an actual quantity of resource blocks included in the normal channel state information subband); and when the resource block remainder is greater than zero, the actual quantity of resource blocks included in the last channel state information subband corresponding to the BWP bandwidth in the channel state information reporting band=the resource block remainder; or when the resource block remainder is equal to zero, the actual quantity of resource blocks included in the last channel state information subband corresponding to the BWP bandwidth in the channel state information reporting band=the actual quantity of resource blocks included in the normal channel state information subband.

Alternatively, determining an actual quantity of resource blocks included in the last channel state information subband corresponding to the CSI-RS bandwidth in the channel state information reporting band includes determining a resource block remainder, where the resource block remainder=mod ((the index number of the initial resource block in the CSI-RS bandwidth+a total quantity of resource blocks included in the CSI-RS bandwidth), an actual quantity of resource blocks included in the normal channel state information subband); and when the resource block remainder is greater than zero, the actual quantity of resource blocks included in the last channel state information subband corresponding to the CSI-RS bandwidth in the channel state information reporting band=the resource block remainder; or when the resource block remainder is equal to zero, the actual quantity of resource blocks included in the last channel state information subband corresponding to the CSI-RS bandwidth in the channel state information reporting band=the actual quantity of resource blocks included in the normal channel state information subband.

In addition, the method further includes: determining that the actual quantity of resource blocks included in the normal channel state information subband is equal to the maximum quantity of resource blocks included in the channel state information subband.

In another aspect, information related to the channel state information subband included in the channel state information reporting band, for example, the quantity of channel state information subbands, or further, the actual quantity of resource blocks included in the first channel state information subband or the actual quantity of resource blocks included in the last channel state information subband in the channel state information subband, may be specified and indicated by the transmit end device to the receive end device. In this case, the method 500 is performed by the transmit end device and may further include:

Step 506 (not shown in the figure): The transmit end device sends, to the receive end device, reporting subband configuration information indicating that each channel state information subband is a reporting subband or a non-reporting subband. In other words, the reporting subband configuration information is used to indicate which subband in the channel state information reporting band is a reporting subband and which subband is not a reporting subband.

The reporting subband configuration information is represented by information bits, and a quantity of the information bits is the same as the quantity of channel state information subbands.

In an implementation, the reporting subband configuration information indicates the quantity of channel state information subbands or further indicates a starting location of the channel state information subband or a starting location and an ending location of the channel state information subband.

In the embodiments of the present application, the non-reporting subband may also be referred to as a lost subband or an omitted subband. The non-reporting subband is a subband whose channel state information does not need to be reported.

The reporting subband configuration information includes a first information bit. The first information bit is used to indicate a reporting subband or a non-reporting subband in the channel state information subbands in the reporting band, that is, indicate which subband in the channel state information subbands is a reporting subband and which subband is a non-reporting subband. In other words, the reporting subband configuration information is implemented by using a bitmap.

Optionally, the channel state information subbands in the reporting band may be reporting subbands, or some of the channel state information subbands are reporting subbands and remaining channel state information subbands are non-reporting subbands. The reporting subband may be represented by using an information bit 1, and the non-reporting subband may be represented by using an information bit 0; or the reporting subband is represented by using an information bit 0, and the non-reporting subband is represented by using an information bit 1.

Optionally, a quantity of first information bits is the same as an actual quantity of reporting subbands, and all of the first information bits are used to indicate the reporting subband and the non-reporting subband or a quantity of first information bits is the same as a system-allowed maximum quantity of reporting subbands, and all or some of the first information bits are used to indicate the reporting subband and the non-reporting subband.

Optionally, the reporting subband configuration information may further indicate the actual quantity of resource blocks included in the first channel state information subband or the actual quantity of resource blocks included in the last channel state information subband in channel state information subbands corresponding to the channel state information reference signal in the channel state information reporting band.

In a specific implementation process, step 506 may be performed by the transceiver module 304 and the transceiver 404.

Certainly, the reporting subband configuration information may also be locally prestored in the transmit end device or the receive end device. A step of searching for the locally prestored reporting subband configuration information and determining a at least one reporting subband based on the non-reporting subband configuration information may be performed by the processing module 302 and the processor 402. It should be noted that the foregoing reporting subband configuration process may be used as a part of the method 500, or the method 500 is used as a part of the foregoing process.

If a plurality of subbands in the foregoing reporting band are divided into a plurality of groups, in a specific implementation, the reporting subband configuration information may be replaced with reporting subband group configuration information. The reporting subband group configuration information is used to indicate which subband group in the reporting band is a reporting subband group. The reporting subband configuration information or the reporting subband group configuration information is used to indicate the at least one reporting subband or at least one reporting subband group. The reporting subband configuration information or the reporting subband group configuration information may specifically indicate each reporting subband or each reporting subband group, or may indicate a configuration solution for the reporting subband or the reporting subband group. It is not difficult to understand that in the former solution, an indication manner is more flexible, but indication overheads are relatively high. In the latter solution, indication overheads are relatively low and an indication manner is relatively fixed. When the configuration solution for the reporting subband or the reporting subband group is used, a plurality of configuration solutions for the reporting subband or the reporting subband group may be agreed in a communications standard, and these configuration solutions for the reporting subband or the reporting subband group may be written into the receive end device and the transmit end device before delivery of the receive end device and the transmit end device, so that in an interaction process of the receive end device and the transmit end device, the reporting subband or the reporting subband group is indicated by transferring an index of the configuration solution for the reporting subband or the reporting subband group. In addition, the plurality of configuration solutions for the non-reporting subband may also be configured by the transmit end device for the receive end device in an interaction process (for example, an initial access process) between the transmit end device and the receive end device. In this case, the method 500 may further include:

receiving the reporting subband configuration information or the reporting subband group configuration information from the transmit end device, where the reporting subband configuration information or the reporting subband group configuration information includes a plurality of configuration solutions for the reporting subband or the reporting subband group, and each configuration solution records a reporting subband including a plurality of reporting subbands or a plurality of reporting subband groups; and determining the plurality of configuration solutions for the reporting subband based on the reporting subband configuration information or the reporting subband group configuration information.

In a specific implementation process, the foregoing step of receiving the reporting subband configuration information from the transmit end device may be performed by the transceiver module 304 and the transceiver 404, and the foregoing step of determining the plurality of configuration solutions for the reporting subband based on the reporting subband configuration information may be performed by the processing module 302 and the processor 402. It should be noted that the foregoing reporting subband configuration process may be used as a part of the method 500, or the method 500 is used as a part of the foregoing process.

In a specific implementation process, the reporting subband configuration information or the reporting subband group configuration information may be sent by using one of the following signaling:

physical layer signaling;

Media Access Control layer signaling; and radio resource control signaling.

Usually, a sending period of the reporting subband configuration information or the reporting subband group configuration information is relatively long. Therefore, the Media Access Control layer signaling or the radio resource control signaling may be preferentially used to transfer the reporting subband configuration information or the reporting subband group configuration information.

In another aspect, a quantity of CSI reporting subbands may also be pre-specified in a communications standard. It is not difficult to understand that compared with the manner of indicating a quantity of reporting subbands, the manner of pre-specifying the quantity of reporting subbands in the communications standard is beneficial to reduction of signaling overheads brought by the indication.

The reporting subband configuration information or the reporting subband group configuration information may be transferred by using one message, or may be transferred by using a plurality of messages. A specific transfer manner is not limited in this embodiment of the present application. In addition, a plurality of same-type information (such as channel state information) may be included in a measurement report in a mutually independent manner, or may be included in a measurement report in a mutually associated manner, or may be included in a measurement report in another manner. For example, the foregoing mutual association manner may be a differential manner. For example, a specific inclusion manner is not limited in this embodiment of the present application.

If the reporting subband needs to be frequently or dynamically indicated, the reporting subband configuration information or the reporting subband group configuration information may be preferentially transferred by using the physical layer signaling.

The physical layer signaling may also be referred to as layer 1 (L1) signaling, and the physical layer signaling may be usually carried by a control portion of a physical layer frame. A typical example of the L1 signaling is downlink control information (DCI) carried in a physical downlink control channel (PDCCH) defined in an LTE standard. In some cases, the L1 signaling may also be carried by a data portion of the physical layer frame. It is not difficult to learn that a sending period or a signaling period of the L1 signaling is usually a period of the physical layer frame. Therefore, such signaling is usually used to implement dynamic control, to transfer some pieces of information that frequently change. For example, resource allocation information may be transferred by using the physical layer signaling.

The Media Access Control (MAC) layer signaling belongs to layer 2 (L2) signaling, and the Media Access Control layer signaling may usually be carried by, for example, but not limited to, a frame header of a layer 2 frame. The frame header may further carry, for example, but is not limited to, information such as a source address and a destination address. In addition to the frame header, the layer 2 frame usually further includes a frame body. In some cases, the L2 signaling may also be carried by the frame body of the layer 2 frame. A typical example of the layer 2 signaling is signaling carried in a frame control field in a frame header of a MAC frame in an 802.11 family standard, or a MAC control entity (MAC-CE) defined in some protocols. The layer 2 frame may usually be carried in the data portion of the physical layer frame. The foregoing reporting subband configuration information may also be sent by using another layer 2 signaling other than the Media Access Control layer signaling.

The radio resource control (RRC) signaling belongs to layer 3 (L3) signaling, and the radio resource control signaling is usually some control messages. The L3 signaling may usually be carried in the frame body of the layer 2 frame. A sending period or a control period of the L3 signaling is relatively long, and the L3 signaling can be used to send some pieces of information that do not frequently change. For example, in some existing communications standards, the L3 signaling is usually used to carry some pieces of configuration information. The reporting subband configuration information or the reporting subband group configuration information may also be sent by using another layer 3 signaling other than the RRC signaling.

The foregoing descriptions are merely principle descriptions of the physical layer signaling, the MAC layer signaling, the RRC signaling, the layer 1 signaling, the layer 2 signaling, and the layer 3 signaling. For specific details of the three types of signaling, refer to the prior art. Therefore, details are not described in this specification.

When the subbands are grouped, for each non-reporting subband, the receive end device may also obtain channel state information of the non-reporting subband through channel estimation, but still do not send the channel state information of the non-reporting subband to the transmit end device. In addition, the transmit end device may set the channel state information of the non-reporting subband by itself. In other words, when setting the channel state information of the non-reporting subband, the transmit end device may not consider an actual channel environment. It is not difficult to understand that feedback overheads brought by channel measurement can be reduced by using this design solution.

After obtaining the channel state information of the non-reporting subband, the transmit end device may further adjust the channel state information. Content related to the adjustment has already been clearly described above. Therefore, details are not described herein again.

The channel state information may be the CQI, and the channel state information of each reporting subband and the channel state information of each non-reporting subband may be the PMI, or the channel state information of each reporting subband and the channel state information of each non-reporting subband may be the CQI. Content related to this belongs to the prior art, and details are not described in this embodiment of the present application. If the foregoing channel-related information is channel state information of a to-be-measured band, and types of the channel state information, the channel state information of each reporting subband, and the channel state information of each non-reporting subband are the same, the channel state information of the to-be-measured band and the channel state information of each reporting subband may be reported in a differential manner. Specifically, the channel state information of the to-be-measured band, and a difference between the channel state information of each reporting subband and the channel state information of the to-be-measured band may be reported.

In a specific implementation process, specific content about the channel-related information is not limited in this embodiment.

Figure 6:
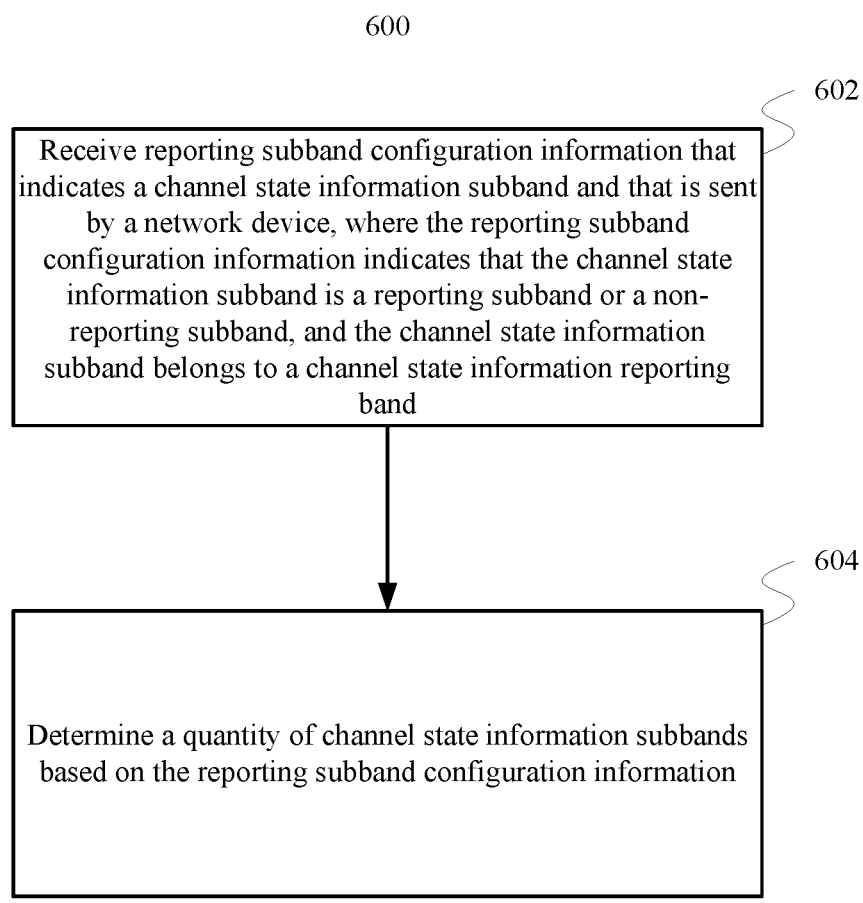
FIG. 6 is a flowchart of a channel state information reporting method according to an embodiment of the present application.

FIG. 6 is a flowchart of an example of a channel measurement method 600 according to an embodiment of the present application. In a specific implementation process, the method 600 may be performed by a receive end device. The receive end device may be implemented by using the communications device 300 shown in FIG. 3 and the communications device 400 shown in FIG. 4. Specifically, the receive end device may be a terminal, and a corresponding transmit end device may be a network device.

Step 602: Receive reporting subband configuration information that indicates a channel state information subband and that is sent by the transmit end device, where the reporting subband configuration information indicates that the channel state information subband is a reporting subband or a non-reporting subband, and the channel state information subband belongs to the channel state information reporting band.

In a specific implementation process, step 602 may be performed by the transceiver module 304 and the transceiver 404.

Step 604: Determine a size and a location of each channel state information subband based on the reporting subband configuration information.

In a specific implementation process, step 604 may be performed by the processing module 302 and the processor 402.

One manner is that the reporting subband configuration information is represented by using information bits, and determining, by the receive end device, a quantity of channel state information subbands included in the channel state information reporting band includes determining, by the receive end device based on the quantity of information bits, the quantity of channel state information subbands included in the channel state information reporting band.

One implementation is that if the reporting subband configuration information that is received by the receive end device and that is sent by the network device does not include the quantity of channel state information subbands included in the channel state information reporting band, the receive end device determines, the quantity of channel state information subbands included in the channel state information reporting band, based on a CC bandwidth or a bandwidth part (BWP) bandwidth or a channel state information reference signal CSI-RS bandwidth, and the channel state information subband size. Specifically:

dividing a total quantity of resource blocks included in the CC bandwidth by the channel state information subband size and then calculate the least integer greater than or equal to the result of division, to obtain the quantity of channel state information subbands included in the channel state information reporting band; or dividing a total quantity of resource blocks included in the bandwidth part (BWP) bandwidth by the channel state information subband size and then calculate the least integer greater than or equal to the result of division, to obtain the quantity of channel state information subbands included in the channel state information reporting band; or dividing a total quantity of resource blocks included in the channel state information reference signal CSI-RS bandwidth by the channel state information subband size and then calculate the least integer greater than or equal to the result of division, to obtain the quantity of channel state information subbands included in the channel state information reporting band.

Another implementation is that the receive end device receives the reporting subband configuration information sent by the transmit end device, and the reporting subband configuration information further includes an actual quantity of resource blocks included in the first channel state information subband or the last channel state information subband; and the receive end device determines, based on the actual quantity of resource blocks included in the first channel state information subband or the last channel state information subband and the channel state information subband size, an index number of the resource block included in the first channel state information subband or the last channel state information subband.

The channel state information subband includes the first channel state information subband, the last channel state information subband, and a normal channel state information subband.

The receive end device may further determine an actual quantity of resource blocks included in the first channel state information subband and an actual quantity of resource blocks included in the last channel state information subband:

determining that a quantity of resource blocks included in the first channel state information subband corresponding to the CC bandwidth in the channel state information reporting band=an actual quantity of resource blocks included in the normal channel state information subband−mod (an index number of an initial resource block in a CC bandwidth, the actual quantity of resource blocks included in the normal channel state information subband); or determining that an actual quantity of resource blocks included in the first channel state information subband corresponding to the BWP bandwidth in the channel state information reporting band=an actual quantity of resource blocks included in the normal channel state information subband-mod (an index number of an initial resource block in the BWP bandwidth, the actual quantity of resource blocks included in the normal channel state information subband); or determining that an actual quantity of resource blocks included in the first channel state information subband corresponding to the CSI-RS bandwidth in the channel state information reporting band=an actual quantity of resource blocks included in the normal channel state information subband−mod (an index number of an initial resource block in a CSI-RS bandwidth, the actual quantity of resource blocks included in the normal channel state information subband), where the actual quantity of resource blocks included in the first channel state information subband is less than or equal to the actual quantity of resource blocks included in the normal channel state information subband.

The determining, by the receive end device, an actual quantity of resource blocks included in the last channel state information subband is specifically determining an actual quantity of resource blocks included in the last channel state information subband corresponding to the CC bandwidth in the channel state information reporting band:

determining a resource block remainder, where the resource block remainder=mod ((the index number of the initial resource block in the CC+a total quantity of resource blocks included in the CC bandwidth), an actual quantity of resource blocks included in the normal channel state information subband); and when the resource block remainder is greater than zero, the actual quantity of resource blocks included in the last channel state information subband corresponding to the CC bandwidth in the channel state information reporting band=the resource block remainder; or when the resource block remainder is equal to zero, the actual quantity of resource blocks included in the last channel state information subband corresponding to the CC bandwidth in the channel state information reporting band=an actual quantity of resource blocks included in the normal channel state information subband.

Determining an actual quantity of resource blocks included in the last channel state information subband corresponding to the BWP bandwidth in the channel state information reporting band includes:

determining a resource block remainder, where the resource block remainder=mod ((the index number of the initial resource block in the BWP bandwidth+a total quantity of resource blocks included in the BWP bandwidth), an actual quantity of resource blocks included in the normal channel state information subband); and when the resource block remainder is greater than zero, the actual quantity of resource blocks included in the last channel state information subband corresponding to the BWP bandwidth in the channel state information reporting band=the resource block remainder; or when the resource block remainder is equal to zero, the actual quantity of resource blocks included in the last channel state information subband corresponding to the BWP bandwidth in the channel state information reporting band=the actual quantity of resource blocks included in the normal channel state information subband.

Determining an actual quantity of resource blocks included in the last channel state information subband corresponding to the CSI-RS bandwidth in the channel state information reporting band includes:

determining a resource block remainder, where the resource block remainder=mod ((the index number of the initial resource block in the CSI-RS bandwidth+a total quantity of resource blocks included in the CSI-RS bandwidth), an actual quantity of resource blocks included in the normal channel state information subband); and when the resource block remainder is greater than zero, the actual quantity of resource blocks included in the last channel state information subband corresponding to the CSI-RS bandwidth in the channel state information reporting band=the resource block remainder; or when the resource block remainder is equal to zero, the actual quantity of resource blocks included in the last channel state information subband corresponding to the CSI-RS bandwidth in the channel state information reporting band=the actual quantity of resource blocks included in the normal channel state information subband.

The actual quantity of resource blocks included in the normal channel state information subband is equal to a maximum quantity of resource blocks included in the channel state information subband.

In another implementation, the reporting subband configuration information sent by the transmit end device to the receive end device further includes an actual quantity of resource blocks included in the first channel state information subband or the last channel state information subband; and the receive end device determines, based on the actual quantity of resource blocks included in the first channel state information subband or the last channel state information subband and the channel state information subband size, an index number of the resource block included in the first channel state information subband or the last channel state information subband.

In still another implementation, the reporting subband configuration information received by the receive end device from the transmit end device further includes an actual quantity of resource blocks included in the first channel state information subband or the last channel state information subband; and the receive end device determines, based on the reporting subband configuration information and the channel state information subband size, an index number of an initial resource block included in the first channel state information subband or the last channel state information subband.

Implementation processes of the present application are further described below with reference to actual examples:

Embodiment 1

This embodiment mainly describes a CC-based CSI reporting band configuration indication method and subband size calculation.

In this embodiment, dividing a CSI reporting band in to CSI subbands is based on an entire CC bandwidth. A quantity of RBs included in the first channel state information subband (first subband), also referred to as a starting subband, and a quantity of RBs included in the last channel state information subband (last subband), also referred to as an ending subband, need to be separately determined.

Step1, Determine a channel state information subband size (PRBs) based on a carrier bandwidth part BWP (PRBs), as shown in Table 4:

TABLE 4

| CC bandwidth part (PRBs) | Subband Size (PRBs) |
|---|---|
| <24 | N/A |
| 24-72 | 4, 8 |
| 73-144 | 8, 16 |
| 145-275 | 16, 32 |

The CSI subband size, i.e., a maximum quantity of RBs that can be included in a subband, is determined based on a quantity of resource blocks (RBs) in a BWP bandwidth $BW_{BWP}$, for example, a quantity of PRBs. The subband size is X RBs/subband.

For example: the BWP bandwidth is $BW_{BWP}$=32RB, a subband size corresponding to the BWP bandwidth is X=4 RBs/subband; or the BWP bandwidth is $BW_{BWP}$=32RB, a subband size corresponding to the BWP bandwidth is X=8 RBs/subband.

In another implementation, the channel state information subband size (Subband Size (PRBs)) may be set to a minimum quantity of resource blocks in $BW_{BWP}$. Therefore, the quantity of channel state information subbands is a system-allowed maximum quantity.

Step 2: Determine a quantity of CSI subbands based on a CC bandwidth.

The quantity of CSI subbands, i.e., a maximum quantity of subbands that can be included in a CC bandwidth, is determined based on the quantity of RBs in the CC bandwidth $BW_{CC}$. The quantity of subbands is N subbands.

$$N = \left\lceil \frac{BW_{CC}}{X} \right\rceil$$

For example, in FIG. 7: the CC bandwidth is $BW_{CC}$=35RB, based on the subband size X=4 RB/subband determined in step 1, a quantity of subbands corresponding to the CC bandwidth is:

$$N = \left\lceil \frac{BW_{CC}}{X} \right\rceil = \left\lceil \frac{35}{4} \right\rceil = 9$$

Figure 8:
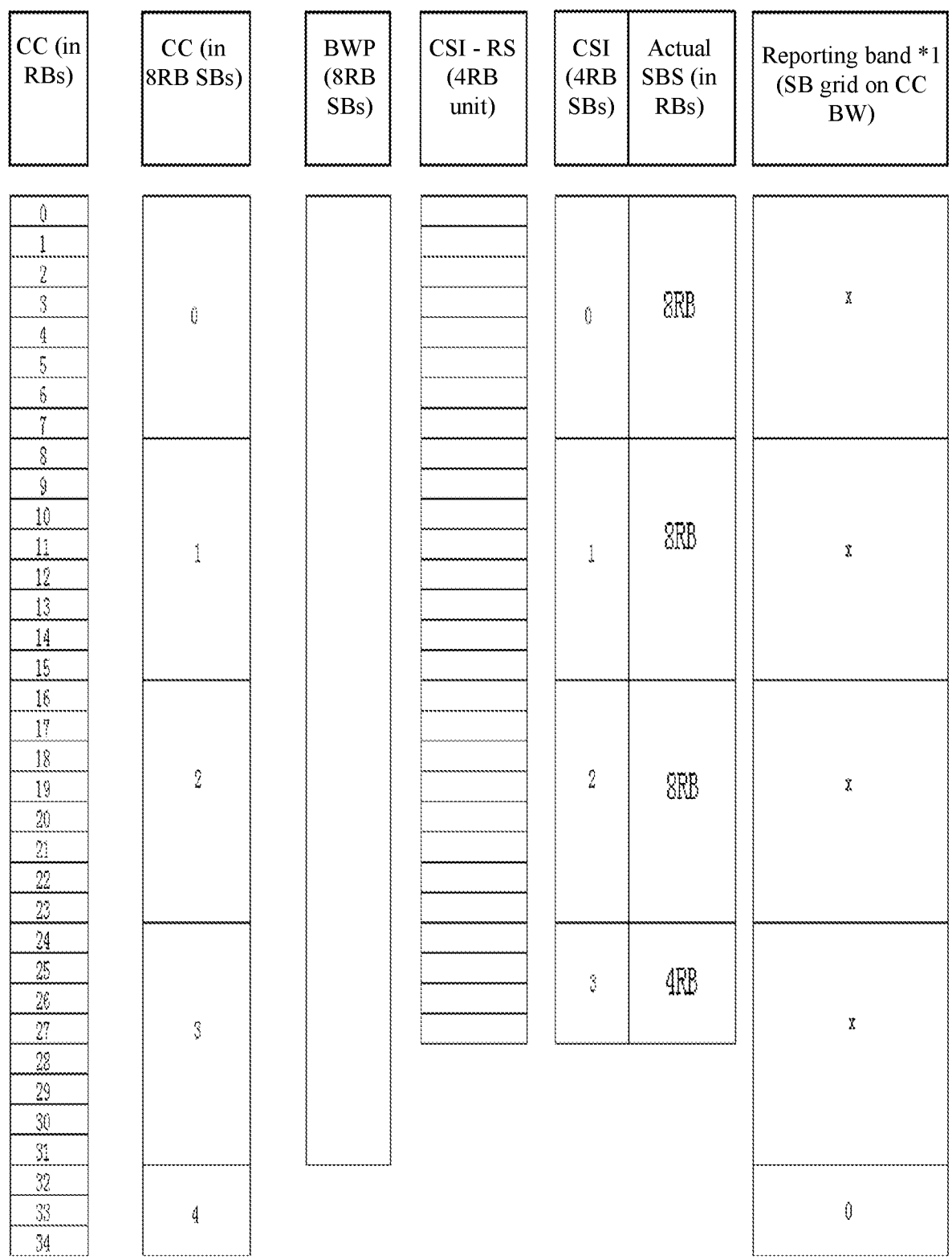
FIG. 8 is a schematic diagram of channel state information configuration according to another embodiment of the present application.

Alternatively, as shown in FIG. 8, based on the subband size X=8 RB/subband determined in step 1, a quantity of subbands corresponding to the CC bandwidth is:

$$N = \left\lceil \frac{BW_{CC}}{X} \right\rceil = \left\lceil \frac{35}{8} \right\rceil = 5$$

Step 3: Determine a quantity of RBs included in the CSI subband based on the CC bandwidth or the BWP bandwidth or a CSI-RS bandwidth, and a frequency domain location. Descriptions are provided below by using an example in which the quantity of RBs included in the CSI subband is determined based on the CSI-RS bandwidth. Determining, based on the CC bandwidth or the BWP bandwidth and the frequency domain location, the quantity of RBs included in the CSI subband is similar thereto, and details are not described herein again.

In a CSI reporting band, a channel state information subband corresponding to the CSI-RS bandwidth includes the first channel state information subband, also referred to as a starting subband, the last channel state information subband, also referred to as an ending subband, and a normal channel state information subband, also referred to as a common subband.

For a method for determining a quantity of RBs in the starting subband and a method for determining a quantity of RBs in the ending subband:

In this embodiment, a bitmap may be used to indicate the channel state information reporting band. In this embodiment, the channel state information reporting band is configured based on the CC bandwidth. Therefore, a quantity of bits in the bitmap is the same as the quantity of subbands included in the CC bandwidth. Specifically, the quantity of bits in the bitmap is 9. Because the initial RB index of the CSI-RS bandwidth=0, the total quantity of resource blocks is 28 RB, and the CSI subband size is 4 RB, a quantity of subbands included in the CSI-RS bandwidth is 7. It is equivalent to that two subbands at the tail of the CSI reporting band configured based on the CC bandwidth are not configured as the CSI-RS bandwidth. Therefore, the two subbands at the tail of the CSI reporting band are set to 0. In the CSI reporting band, CSI subbands corresponding to the CSI-RS bandwidth are the first seven CSI subbands, and bits corresponding to the seven CSI subbands are represented by using x. If x is set to 1, it indicates that the subband is used as a reporting subband; or if x is set to 0, it indicates that the subband is a non-reporting subband. For example, the third x may be set to 0, it indicates that the third subband is not used as the reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application. Alternatively, in FIG. 8:

the CSI-RS frequency band is set to (initial RB index=0, CSI-RS BW=28), and the following quantities of RBs included in the subbands (subband size is 8 RBs) may be obtained based on the foregoing calculation method:

---

(RS BW >= 1 legacy subband size)// an RS bandwidth is greater than or equal to a normal subband size
    // /determine a starting subband size (i.e, an actual quantity of resource blocks included in the starting subband)
      starting subband size = legacy subband size-mod (initial RB index, legacy subband size)//the starting subband size = the normal subband size (i.e., an actual quantity of resource blocks included in the normal CSI subband) − mod (an index number of an initial resource block in the CSI-RS bandwidth, the normal subband size)
    //determine the ending subband size//determine an ending subband size (i.e., an actual quantity of resource blocks included in the ending subband)
      remainder = mod ((initial RB index + BW), legacy subband size)//a resource block remainder = mod ((the index number of the initial resource block in the CSI-RS bandwidth + a total quantity of resource blocks included in the CSI-RS bandwidth), the normal channel state information subband size;
        (remainder > 0)//when the resource block remainder is greater than zero
          ending subband size = remainder//the ending subband size (i.e., the actual quantity of resource blocks included in the ending subband) = the resource block remainder;
        else//otherwise
          ending subband size = legacy subband size//the ending subband size (i.e., the actual quantity of resource blocks included in the ending subband) = the normal channel state information subband size
        end//end
    Else//or
      ... ...
    End//end

---

For example, in FIG. 7: the CSI-RS frequency band is set to (initial RB index=0, CSI-RS BW=28), and the following quantities of RBs included in the subbands (subband size is 4 RBs) may be obtained based on the foregoing calculation method:

the starting subband: 4 RB−mod (0, 4)=4 RB;

the common subband: 4 RB; and the ending subband: mod ((0+28), 4)=4 RB.

the starting subband: 8 RB−mod (0, 8)=8 RB;

the common subband: 8 RB; and the ending subband: mod ((0+28), 8)=4 RB.

In this embodiment, a bitmap may be used to indicate the channel state information reporting band (Reporting band). In this embodiment, the channel state information reporting band is configured based on the CC. Therefore, a quantity of bits in the bitmap is the same as the quantity of subbands included in the CC bandwidth. Specifically, the quantity of bits in the bitmap is 5. Because the initial RB index of the CSI-RS bandwidth=0, the total quantity of resource blocks is 28 RB, and the subband size in the CSI-RS bandwidth is 8 RB, the quantity of subbands in the CSI-RS bandwidth is 4. It is equivalent to that one subband at the tail of the CSI reporting band configured based on the CC bandwidth is not configured as the CSI-RS bandwidth. Therefore, the subband is set to 0. In the CSI reporting band, CSI subbands corresponding to the CSI-RS bandwidth are the first four CSI subbands, and bits corresponding to the four CSI subbands are represented by using x. If x is set to 1, it indicates that the subband is used as a reporting subband; or if x is set to 0, it indicates that the subband is a non-reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application.

Figure 9:
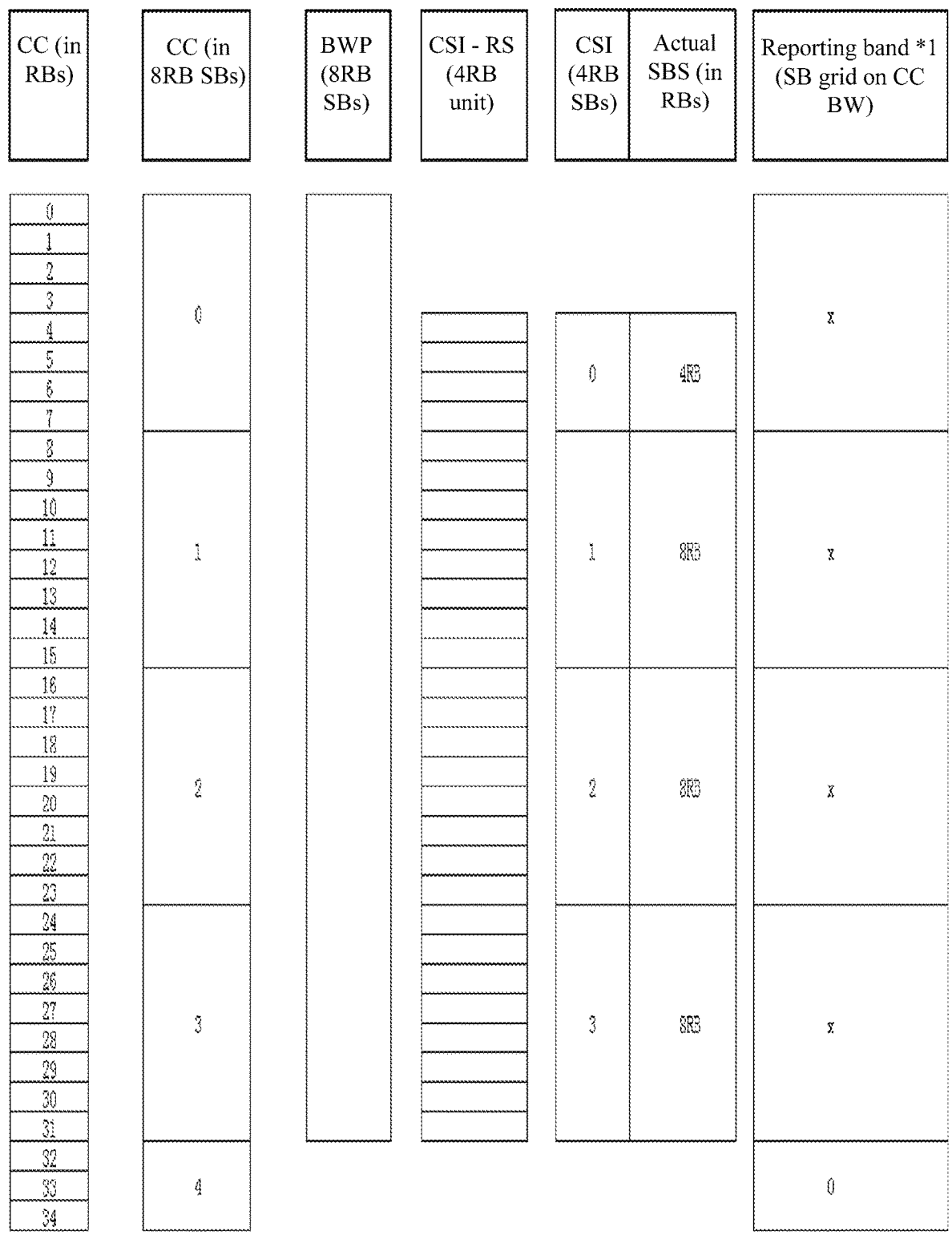
FIG. 9 is a schematic diagram of channel state information configuration according to another embodiment of the present application.

Alternatively, in FIG. 9: a CSI-RS frequency band is set to (initial RB index=4, CSI-RS BW=28), the following quantities of RBs included in the subbands (subband size is 8 RBs) may be obtained based on the foregoing calculation method:

the starting subband: 8 RB− mod (4, 8)=4 RB;
the common subband: 8 RB; and
the ending subband: 8 RB.

In this embodiment, a bitmap may be used to indicate the channel state information reporting band. In this embodiment, the channel state information reporting band is configured based on the CC. Therefore, a quantity of bits in the bitmap is the same as the quantity of subbands included in the CC. Specifically, the quantity of bits in the bitmap is 5. Because the initial RB index of the CSI-RS bandwidth=4, the total quantity of resource blocks is 28 RB, and the subband size in the CSI-RS bandwidth is 8 RB, the quantity of subbands in the CSI-RS bandwidth is 4. It is equivalent to that one subband at the tail of the CSI reporting band configured based on the CC bandwidth is not configured as the CSI-RS bandwidth. Therefore, the subband is set to 0. In the CSI reporting band, CSI subbands corresponding to the CSI-RS bandwidth are the first four CSI subbands, and bits corresponding to the four CSI subbands are represented by using x. If x is set to 1, it indicates that the subband is used as a reporting subband; or if x is set to 0, it indicates that the subband is a non-reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application.

A beneficial effect of the method is that terminal addressing (absolute addressing) complexity is reduced based on uniform configuration for a CC physical bandwidth.

Embodiment 2

This embodiment mainly describes a BWP-based CSI reporting band configuration indication method and subband size calculation.

In this embodiment, dividing a CSI reporting band in to CSI subbands is based on a bandwidth part (BWP) bandwidth. A quantity of RBs included in the first channel state information subband (first subband), also referred to as a starting subband, and a quantity of RBs included in the last channel state information subband, also referred to as an ending subband (last subband), in CSI subbands corresponding to a CSI-RS bandwidth, need to be separately determined.

First, a channel state information subband size (PRBs) is determined based on a CC bandwidth part (PRBs), as shown in the foregoing Table 4.

The CSI subband size, i.e., a maximum quantity of RBs that can be included in a subband, is determined based on a quantity of resource blocks (RBs) in a BWP bandwidth $BW_{BWP}$, for example, a quantity of PRBs. The subband size is X RBs/subband.

For example: the BWP bandwidth is $BW_{BWP}$=32RB, a subband size corresponding to the BWP bandwidth is X=4 RB/subband; or the BWP bandwidth is $BW_{BWP}$=32RB, a subband size corresponding to the BWP bandwidth is X=8 RB/subband.

Step 2: Determine a quantity of CSI subbands based on the BWP.

The quantity of CSI subbands, i.e., a maximum quantity of subbands that can be included in a BWP, is determined based on the quantity of RBs in the BWP bandwidth $BW_{BWP}$. The quantity of subbands is N subbands.

$$N = \left\lceil \frac{BW_{BWP}}{X} \right\rceil$$

For example, in FIG. 10:
the BWP bandwidth is $BW_{BWP}$=32RB, based on the subband size X=4 RBs/subband determined in step 1, a quantity of subbands corresponding to the BWP bandwidth is:

$$N = \left\lceil \frac{BW_{BWP}}{X} \right\rceil = \left\lceil \frac{32}{4} \right\rceil = 8$$

Alternatively, as shown in FIG. 11: based on the subband size X=8 RB/subband determined in step 1, a quantity of subbands corresponding to the BWP bandwidth is:

$$N = \left\lceil \frac{BW_{BWP}}{X} \right\rceil = \left\lceil \frac{32}{8} \right\rceil = 4$$

Step 3: Determine, a quantity of RBs included in the CSI subband, based on a CC bandwidth or the BWP or a CSI-RS bandwidth, and a frequency domain location. Descriptions are provided below by using an example in which the quantity of RBs included in the CSI subband is determined based on the CSI-RS bandwidth. Determining, based on the CC bandwidth or the BWP and the frequency domain location, the quantity of RBs included in the CSI subband is similar thereto, and details are not described herein again.

In a CSI reporting band, a channel state information subband corresponding to the CSI-RS bandwidth includes the first channel state information subband, also referred to as a starting subband, the last channel state information subband, also referred to as an ending subband, and a normal channel state information subband, also referred to as a common subband.

For a method for determining a quantity of RBs in the starting subband and a method for determining a quantity of RBs in the ending subband:

(RS BW >= 1 legacy subband size)//If an RS bandwidth is greater than or equal to a normal subband size
　　// determine a starting subband size (i.e., an actual quantity of resource blocks included in the starting subband)
　　starting subband size = legacy subband size − mod (initial RB index, legacy subband size)//the starting subband size = the normal subband size (i.e., an actual quantity of resource blocks included in the normal CSI subband) − mod (an index number of an initial resource block in the CSI-RS bandwidth, the normal subband size)
　　//determine the ending subband size//determine an ending subband size (i.e., an actual quantity of resource blocks included in the ending subband)
　　remainder = mod ((initial RB index + BW), legacy subband size)//a resource block remainder = mod ((the index number of the initial resource block in the CSI-RS bandwidth + a total quantity of resource blocks included in the CSI-RS bandwidth), the normal channel state information subband size;
　　　　(remainder > 0)//when the resource block remainder is greater than zero
　　　　　ending subband size = remainder//the ending subband size (i.e., the actual quantity of resource blocks included in the ending subband) = the resource block remainder;
　　　　else//otherwise
　　　　　ending subband size = legacy subband size//the ending subband size (i.e., the actual quantity of resource blocks included in the ending subband) = the normal channel state information subband size
　　　　end//end
　　Else//or
　　　... ...
　　End//end For example, in FIG. 10: the CSI-RS frequency band is set to (initial RB index=0, CSI-RS BW=28), the following quantities of RBs included in the subbands (subband size is 4 RBs) may be obtained based on the foregoing calculation method:

the starting subband: 4 RB−mod (0, 4)=4 RB;
the common subband: 4 RB; and
the ending subband: mod ((0+28), 4)=4 RB.

In this embodiment, a bitmap may be used to indicate the channel state information reporting band. In this embodiment, the channel state information reporting band is configured based on the BWP bandwidth. Therefore, a quantity of bits in the bitmap is the same as the quantity of subbands included in the BWP bandwidth. Specifically, the quantity of bits in the bitmap is 8. Because the initial RB index of the CSI-RS bandwidth=0, the total quantity of resource blocks is 28 RB, and the subband size in the CSI-RS bandwidth is 4 RB, a quantity of subbands in the CSI-RS bandwidth is 7. It is equivalent to that one subband at the tail of the CSI reporting band configured based on the BWP bandwidth is not configured as the CSI-RS bandwidth. Therefore, the subband at the tail of the CSI reporting band is set to 0. In the CSI reporting band, CSI subbands corresponding to the CSI-RS bandwidth are the first seven CSI subbands, and bits corresponding to the seven CSI subbands are represented by using x. If x is set to 1, it indicates that the subband is used as a reporting subband; or if x is set to 0, it indicates that the subband is a non-reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application.

Alternatively, in FIG. 11: the CSI-RS frequency band is set to (initial RB index=0, CSI-RS BW=28), the following quantities of RBs included in the subbands (subband size 8 RB) may be obtained based on the foregoing calculation method:

the starting subband: 8 RB−mod (0, 8)=8 RB;
the common subband: 8 RB; and
the ending subband: mod ((0+28), 8)=4 RB.

In this embodiment, a bitmap may be used to indicate the channel state information reporting band. In this embodiment, the channel state information reporting band is configured based on the BWP bandwidth. Therefore, a quantity of bits in the bitmap is the same as the quantity of subbands included in the BWP bandwidth. Specifically, the quantity of bits in the bitmap is 4. Because the initial RB index of the CSI-RS bandwidth=0, the total quantity of resource blocks is 28 RB, and the subband size in the CSI-RS bandwidth is 8 RB, a quantity of subbands in the CSI-RS bandwidth is 4. In the CSI reporting band, there are four CSI subbands corresponding to the CSI-RS bandwidth, and bits corresponding to the four CSI subbands are represented by using x. If x is set to 1, it indicates that the subband is used as a reporting subband; or if x is set to 0, it indicates that the subband is a non-reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application.

Figure 12:
FIG. 12 is a schematic diagram of channel state information configuration according to another embodiment of the present application.
Figure 12:
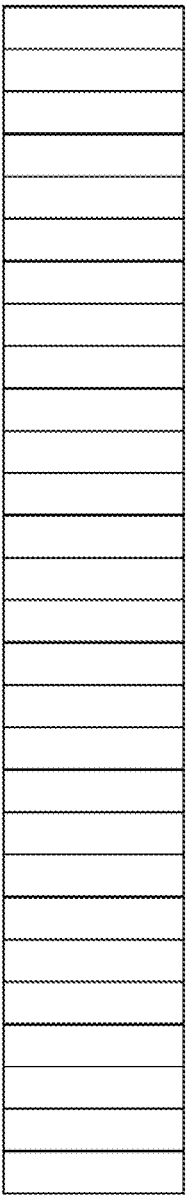
Figure 12:
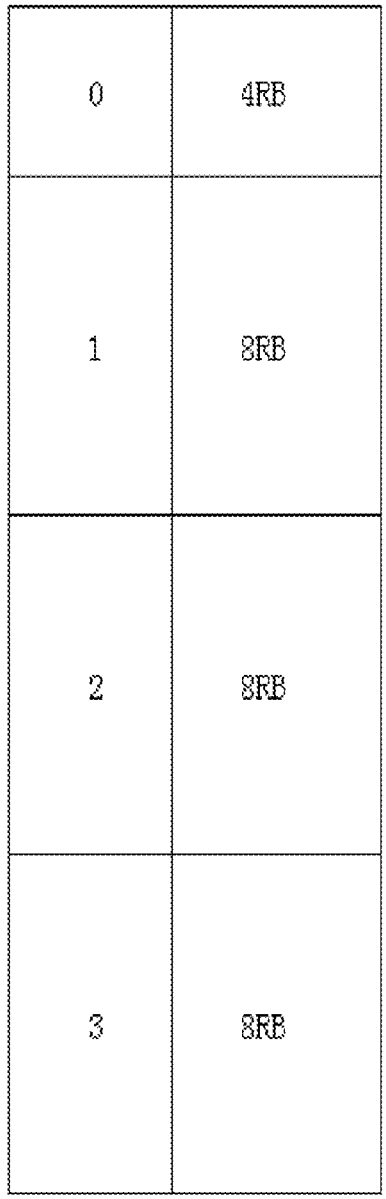
Figure 12:
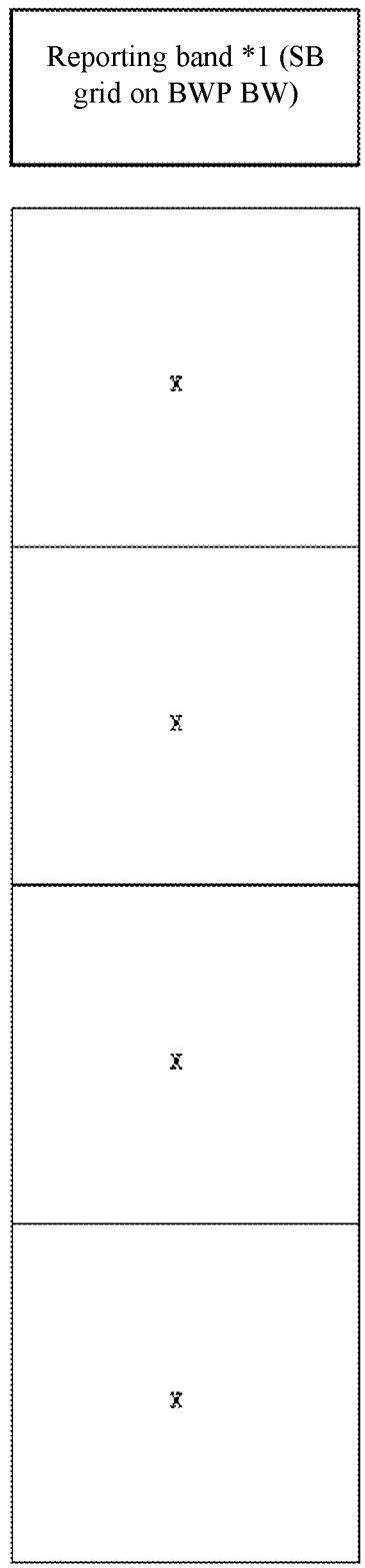

Alternatively, in FIG. 12: the CSI-RS frequency band is set to (initial RB index=4, CSI-RS BW=28), the following quantities of RBs included in the subbands (subband size is 8 RBs) may be obtained based on the foregoing calculation method:

the starting subband: 8 RB−mod (4, 8)=4 RB;
the common subband: 8 RB; and
the ending subband: 8 RB.

In this embodiment, a bitmap may be used to indicate the channel state information reporting band. In this embodiment, the channel state information reporting band is configured based on the BWP bandwidth. Therefore, a quantity of bits in the bitmap is the same as the quantity of subbands included in the BWP. Specifically, the quantity of bits in the bitmap is 4. Because the initial RB index of the CSI-RS bandwidth=4, the total quantity of resource blocks is 28 RB, and the subband size in the CSI-RS bandwidth is 8 RB, a quantity of subbands in the CSI-RS bandwidth is 4. In the CSI reporting band, there are four CSI subbands corresponding to the CSI-RS bandwidth, and bits corresponding to the four CSI subbands are represented by using x. If x is set to 1, it indicates that the subband is used as a reporting subband; or if x is set to 0, it indicates that the subband is a non-reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application.

A beneficial effect of Embodiment 2 is that, compared with Embodiment 1, a smaller quantity of bits are set for CSI subband configuration based on flexible configuration for the BWP bandwidth.

Embodiment 3

This embodiment mainly describes a CSI-RS-based CSI reporting band configuration indication method and subband size calculation.

In this embodiment, dividing a CSI reporting band in to CSI subbands is based on a CSI-RS band. A quantity of RBs included in the first channel state information subband (first subband), also referred to as a starting subband, and a quantity of RBs included in the last channel state information subband, also referred to as an ending subband (last subband), in CSI subbands corresponding to a CSI-RS bandwidth in the CSI reporting band need to be separately determined.

First, a channel state information subband size (PRBs) is determined based on a CC bandwidth (PRBs), as shown in the foregoing Table 4.

The CSI subband size, i.e., a maximum quantity of RBs that can be included in a subband, is determined based on a quantity of resource blocks (RBs) in a BWP bandwidth $BW_{BWP}$, for example, a quantity of PRBs. The subband size is X RBs/subband.

For example: the BWP bandwidth is $BW_{BWP}$=32RB, the subband size corresponding to the BWP bandwidth is X=4 RB/subband; or the BWP bandwidth is $BW_{BWP}$=32RB, the subband size corresponding to the BWP bandwidth is X=8 RB/subband.

Step 2: Determine a quantity of CSI subbands based on a CSI-RS bandwidth.

The quantity of CSI subbands, i.e., a maximum quantity of subbands that can be included in a CSI-RS bandwidth is determined based on a quantity of RBs in the CSI-RS bandwidth. The quantity of subbands is N subbands.

$$N = \left\lceil \frac{BW_{CSI-RS}}{X} \right\rceil$$

For example, in FIG. 13: the CSI-RS bandwidth is $BW_{BWP}$=28RB, based on the subband size X=4 RB/subband determined in step 1, a quantity of subbands corresponding to the CSI-RS bandwidth is:

$$N = \left\lceil \frac{BW_{CSI-RS}}{X} \right\rceil = \left\lceil \frac{28}{4} \right\rceil = 7$$

Figure 14:
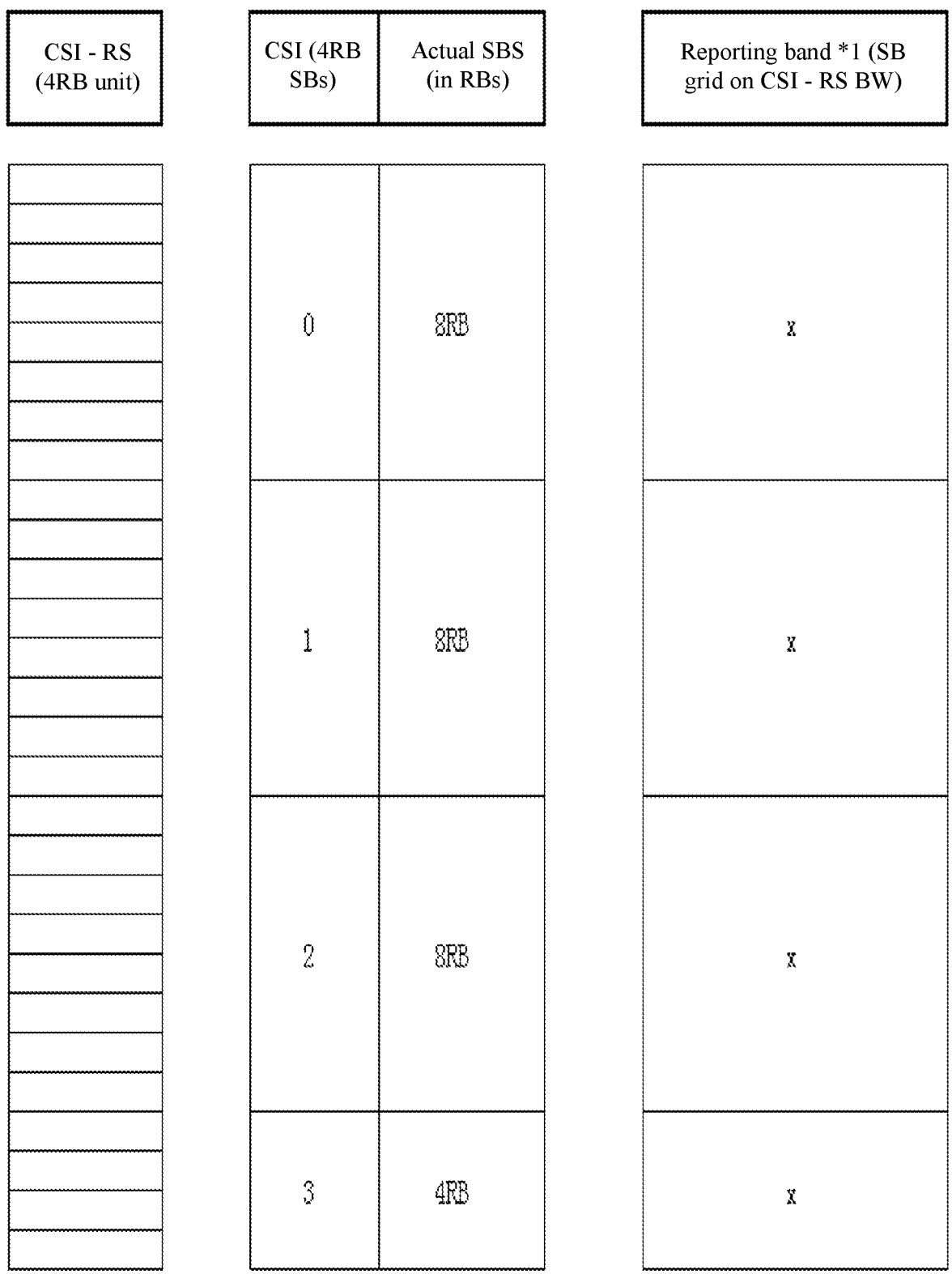
FIG. 14 is a schematic diagram of channel state information configuration according to another embodiment of the present application.

Alternatively, as shown in FIG. 14:
based on the subband size X=8 RB/subband determined in step 1, a quantity of subbands corresponding to the CSI-RS bandwidth is:

$$N = \left\lceil \frac{BW_{CSI-RS}}{X} \right\rceil = \left\lceil \frac{28}{8} \right\rceil = 4$$

Step 3: Determine a quantity of RBs included in the CSI subband, based on a CC bandwidth or the BWP bandwidth or the CSI-RS bandwidth, and a frequency domain location. Descriptions are provided below by using an example in which the quantity of RBs included in the CSI subband is determined based on the CSI-RS bandwidth. Determining, based on the CC bandwidth or the BWP bandwidth and the frequency domain location, the quantity of RBs included in the CSI subband is similar thereto, and details are not described herein again.

In a CSI reporting band, a CSI subband corresponding to the CSI-RS bandwidth includes the first channel state information subband, also referred to as a starting subband, the last channel state information subband, also referred to as an ending subband, and a normal channel state information subband, also referred to as a common subband.

For a method for determining a quantity of RBs in the starting subband and a method for determining a quantity of RBs in the ending subband:

```
(RS BW >= 1 legacy subband size)//If an RS bandwidth is greater than or equal to
a normal subband size
    // determine a starting subband size (i.e., an actual quantity of resource blocks
included in the starting subband)
        starting subband size = legacy subband size- mod (initial RB index, legacy
subband size)//the starting subband size = the normal subband size (i.e., an actual quantity of
resource blocks included in the normal CSI subband)- mod (an index number of an initial
resource block in the CSI-RS bandwidth, the normal subband size)
        //determine the ending subband size//determine an ending subband size (i.e., an
actual quantity of resource blocks included in the ending subband)
        remainder = mod ((initial RB index + BW), legacy subband size)//a
resource block remainder = mod ((the index number of the initial resource block in the
CSI-RS bandwidth + a total quantity of resource blocks in the CSI-RS bandwidth), the
normal channel state information subband size;
            (remainder > 0)//when the resource block remainder is greater than zero
                ending subband size = remainder//the ending subband size (i.e., the
actual quantity of resource blocks included in the ending subband) = the resource block
remainder;
            else//otherwise
                ending subband size = legacy subband size//the ending subband size
(i.e., the actual quantity of resource blocks included in the ending subband) = the normal
channel state information subband size
            end//end
    Else//or
        ... ...
    End//end
```

For example, in FIG. 13: the CSI-RS frequency band is set to (initial RB index=0, CSI-RS BW=28), the following quantities of RBs included in the subbands (subband size is 4 RBs) may be obtained based on the foregoing calculation method:

the starting subband: 4 RB− mod (0, 4)=4 RB;
the common subband: 4 RB; and
the ending subband: mod ((0+28), 4)=4 RB.

In this embodiment, a bitmap may be used to indicate the channel state information reporting band. In this embodiment, the channel state information reporting band is configured based on the CSI-RS bandwidth. Therefore, a quantity of bits in the bitmap is the same as a quantity of subbands included in the CSI-RS bandwidth. Specifically, the quantity of bits in the bitmap is 7. In the CSI reporting band, there are seven CSI subbands corresponding to the CSI-RS bandwidth, and bits corresponding to the seven CSI subbands are represented by using x. If x is set to 1, it indicates that the subband is used as a reporting subband; or if x is set to 0, it indicates that the subband is a non-reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application.

Alternatively, in FIG. 14: the CSI-RS frequency band is set to (initial RB index=0, CSI-RS BW=28), the following quantities of RBs included in the subbands (subband size is 8 RBs) may be obtained based on the foregoing calculation method:

the starting subband: 8 RB−mod (0, 8)=8 RB;
the common subband: 8 RB; and
the ending subband: mod ((0+28), 8)=4 RB.

In this embodiment, a bitmap may be used to indicate the channel state information reporting band. In this embodiment, the channel state information reporting band is configured based on the CSI-RS bandwidth. Therefore, a quantity of bits in the bitmap is the same as the quantity of subbands included in the CSI-RS bandwidth. Specifically, the quantity of bits in the bitmap is 4. In the CSI reporting band, there are four CSI subbands corresponding to the CSI-RS bandwidth, and bits corresponding to the four CSI subbands are represented by using x. If x is set to 1, it indicates that the subband is used as a reporting subband; or if x is set to 0, it indicates that the subband is a non-reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application.

Figure 15:
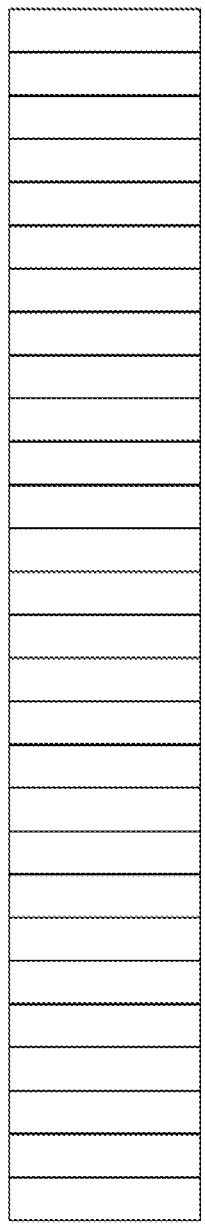
FIG. 15 is a schematic diagram of channel state information configuration according to another embodiment of the present application.
Figure 15:
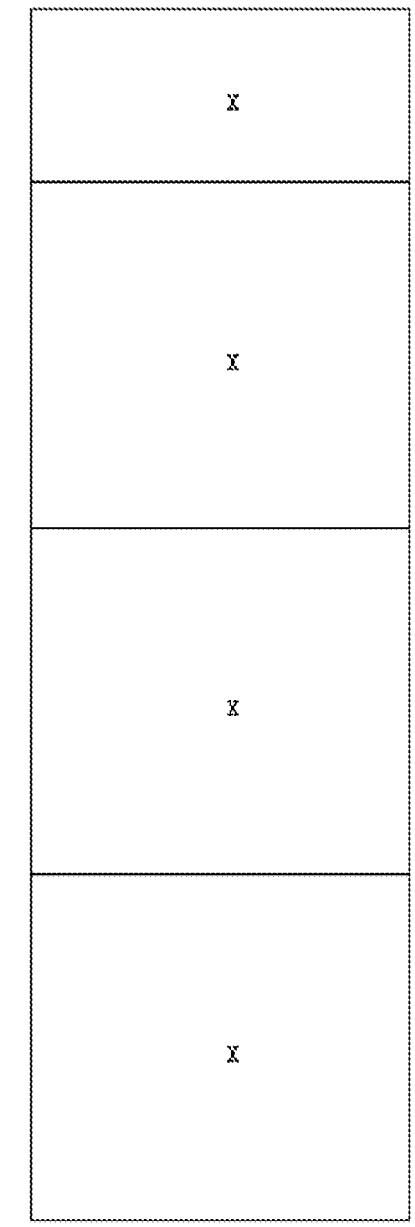

Alternatively, in FIG. 15: the CSI-RS frequency band is set to (initial RB index=4, CSI-RS BW=28), the following quantities of RBs included in the subbands (subband size is 8 RBs) may be obtained based on the foregoing calculation method:

the starting subband: 8 RB−mod (4, 8)=4 RB;
the common subband: 8 RB; and
the ending subband: 8 RB.

In this embodiment, a bitmap may be used to indicate the channel state information reporting band. In this embodiment, the channel state information reporting band is configured based on the CSI-RS bandwidth. Therefore, a quantity of bits in the bitmap is the same as the quantity of subbands included in the CSI-RS bandwidth. Specifically, the quantity of bits in the bitmap is 4. In the CSI reporting band, there are four CSI subbands corresponding to the CSI-RS bandwidth, and bits corresponding to the four CSI subbands are represented by using x. If x is set to 1, it indicates that the subband is used as a reporting subband; or if x is set to 0, it indicates that the subband is a non-reporting subband.

Certainly, the bit is set to 0, indicating a non-reporting subband; and the bit is set to 1, indicating a reporting subband. This is merely one implementation. Variations made by a person skilled in the art based on this all fall within the protection scope of this application.

A beneficial effect of the method is that, compared with Embodiment 2, a smaller quantity of bits are set for CSI reporting band configuration based on flexible configuration for the CSI-RS bandwidth.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, all or some of the procedures or functions according to the embodiments of the present application are generated. The computer may be a general-purpose computer, a dedicated computer, a computer network, or another programmable apparatus. The computer instruction may be stored in a computer readable storage medium or may be transmitted from a computer readable storage medium to another computer readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (such as a floppy disk, a hard disk, or a magnetic tape), an optical medium (such as a DVD), a semiconductor medium (such as a solid state disk Solid State Disk (SSD)), or the like.

In conclusion, the foregoing descriptions are merely embodiments of the present application, but are not intended to limit the protection scope of the present application. Any modification, equivalent replacement, or improvement made without departing from the spirit and principle of the present application shall fall within the protection scope of the present application.

What is claimed is:

1. A method for configuring a channel state information reporting frequency band, the method comprising:
   determining an actual quantity of resource blocks in a normal channel state information subband belonging to a channel state information reporting frequency band based on a bandwidth part (BWP),
      wherein the channel state information reporting frequency band comprises a first and last channel state information subbands and the normal channel state information subband; and
   determining an actual quantity of resource blocks in each of the first and last channel state information subbands based on the actual quantity of resource blocks in the normal channel state information subband,
      wherein the actual quantity of resource blocks in the first channel state information subband equals the actual quantity of resource blocks in the normal channel state information subband minus mod (an index number of an initial resource block in the BWP, the actual quantity of resource blocks included in the normal channel state information subband).

2. The method according to claim 1, wherein determining the actual quantity of resource blocks in the last channel state information subband comprises:
   determining a resource block remainder,
      wherein the resource block remainder equals mod ((the index number of the initial resource block in the BWP plus a total quantity of resource blocks in the BWP bandwidth), the actual quantity of resource blocks in the normal channel state information subband); and
   the actual quantity of resource blocks in the last channel state information subband equals (1) the resource block remainder in response to the resource block remainder being greater than zero or (2) the actual quantity of resource blocks in the normal channel state information subband in response to the resource block remainder being equal to zero.

3. The method according to claim 1, wherein the method further comprises:
   determining a quantity of channel state information subbands included in the channel state information reporting frequency band based on the BWP and the actual quantity of resource blocks in the normal channel state information subband; and
   sending a reporting subband configuration information to a receive end device,
      wherein the reporting subband configuration information indicates the actual quantity of resource blocks in the normal channel state information subband belonging to the channel state information reporting frequency band.

4. The method according to claim 3, wherein the reporting subband configuration information is represented by using information bits, and a quantity of information bits is the same as the quantity of channel state information subbands in the channel state information reporting frequency band.

5. The method according to claim 3, wherein determining the quantity of channel state information subbands in the channel state information reporting frequency band based on the BWP and the actual quantity of resource blocks in the normal channel state information subband comprises:
   dividing a total quantity of resource blocks in the BWP by the actual quantity of resource blocks in the normal channel state information subband; and
   based on a result of the division, determining a least integer that is greater than or equal to the result of the division in order to obtain the quantity of channel state information subbands in the channel state information reporting frequency band.

6. A transmit end device comprising at least one processor and a memory storing instructions for execution by the processor such that, when the processor executes the instructions, the processor is configured to provide at least the following operations:
   determine an actual quantity of resource blocks in a normal channel state information subband belonging to a channel state information reporting frequency band based on a bandwidth part (BWP),
      wherein the channel state information reporting frequency band comprises first and last channel state information subbands and the normal channel state information subband; and
   determine an actual quantity of resource blocks in each of the first and last channel state information subband based on the actual quantity of resource blocks in the normal channel state information subband,
      wherein the actual quantity of resource blocks in the first channel state information subband equals the actual quantity of resource blocks in the normal channel state information subband minus mod (an index number of an initial resource block in the BWP, the actual quantity of resource blocks comprised in the normal channel state information subband).

7. The transmit end device according to claim 6, wherein for determining the actual quantity of resource blocks in the last channel state information subband, the processor is further configured to provide at least the following operations:
   determine a resource block remainder,
      wherein the resource block remainder equals mod ((the index number of the initial resource block in the BWP plus a total quantity of resource blocks in the BWP bandwidth), the actual quantity of resource blocks in the normal channel state information subband); and
   the actual quantity of resource blocks in the last channel state information subband equals (1) the resource block remainder in response to the resource block remainder being greater than zero or (2) the actual quantity of resource blocks in the normal channel state information subband in response to the resource block remainder being equal to zero.

8. The transmit end device according to claim 6, wherein the processor is further configured to determine a quantity of channel state information subbands included in the channel state information reporting frequency band based on the BWP and the actual quantity of resource blocks in the normal channel state information subband.

9. The transmit end device according to claim 8, further comprising a transmitter configured to cooperate with the processor to send reporting subband configuration information to a receive end device,
   wherein reporting subband configuration information indicates the actual quantity of resource blocks in the normal channel state information subband belonging to the channel state information reporting frequency band.

10. The transmit end device according to claim 9, wherein reporting subband configuration information is represented by using information bits, and a quantity of information bits is the same as the quantity of channel state information subbands in the channel state information reporting frequency band.

11. The transmit end device according to claim 8, wherein the processor is further configured to:
   divide a total quantity of resource blocks in the BWP by the actual quantity of resource blocks in the normal channel state information subband; and
   from a result of the division, determine the least integer that is greater than or equal to the result of the division in order to obtain the quantity of channel state information subbands in the channel state information reporting frequency band.

12. A non-transitory computer readable medium storing instructions for execution by a processor that, when executed by the processor, cause the processor to be configured to provide at least the following operations:
   determining an actual quantity of resource blocks in a normal channel state information subband belonging to a channel state information reporting frequency band based on a bandwidth part (BWP),
wherein the channel state information reporting frequency band comprises first and last channel state information subbands and the normal channel state information subband; and
determining an actual quantity of resource blocks in each of the first and last channel state information subbands based on the actual quantity of resource blocks in the normal channel state information subband,
wherein the actual quantity of resource blocks in the first channel state information subband equals the actual quantity of resource blocks in the normal channel state information subband minus mod (an index number of an initial resource block in the BWP, the actual quantity of resource blocks comprised in the normal channel state information subband).

13. The non-transitory computer readable medium according to claim 12, wherein the instructions, when executed, cause the processor to be configured to provide at least the following further operations:
sending reporting subband configuration information indicating a reporting subband or a non-reporting subband in the channel state information subband,
wherein the reporting subband configuration information indicates the quantity of the of channel state information subbands in the channel state information reporting frequency band, or
wherein the reporting subband configuration information is represented by using information bits, and a quantity of information bits is the same as the quantity of channel state information subbands in the channel state information reporting frequency band.

14. A chip comprising at least one processor and a memory, wherein the at least one processor executes a program instruction stored in the memory that causes the processor to configure a channel state information reporting frequency band by:
determining an actual quantity of resource blocks in a normal channel state information subband belonging to a channel state information reporting frequency band based on a bandwidth part (BWP),
wherein the channel state information reporting frequency band comprises first and last channel state information subbands and the normal channel state information subband; and
determining an actual quantity of resource blocks in each of the first and last channel state information subbands based on the actual quantity of resource blocks in the normal channel state information subband,
wherein the actual quantity of resource blocks in the first channel state information subband equals the actual quantity of resource blocks in the normal channel state information subband minus mod (an index number of an initial resource block in the BWP, the actual quantity of resource blocks comprised in the normal channel state information subband).

15. The chip according to claim 14, wherein the processor further configures the channel state information reporting frequency band by:
determining a resource block remainder,
wherein the resource block remainder equals mod (the index number of the initial resource block in the BWP plus a total quantity of resource blocks in the BWP bandwith), the actual quantity of resource blocks in the normal channel state information subband); and
the actual quantity of resource blocks in the last channel state information subband equals (a) the resource block remainder in response to the resource block remainder being greater than zero, or (b) the actual quantity of resource blocks in the normal channel state information subband in response to the resource block remainder being equal to zero.

* * * * *

UNITED STATES PATENT AND TRADEMARK OFFICE
CERTIFICATE OF CORRECTION

PATENT NO. : 11,239,950 B2  
APPLICATION NO. : 16/697115  
DATED : February 1, 2022  
INVENTOR(S) : Han et al.

Page 1 of 2

It is certified that error appears in the above-identified patent and that said Letters Patent is hereby corrected as shown below:

On the Title Page

Other Publications, Line 2: "WG1, Reno, USA, R1-1720300, XP051368949, pp. 1-4, 3rd Gen-" should read -- WG1 91, Reno, USA, R1-1720300, XP051368949, pp. 1-4, 3rd Gen- --.

Page 2: Other Publications, Line 3: "specification (Release 15)," 3GPP TS 38,331 V1.0.0, XP051670285," should read -- specification (Release 15)," 3GPP TS 38.331 V1.0.0, XP051670285, --.

Page 2: Other Publications, Line 6: ""On CSI subband size," 3GPP TSG RAN WG1, Reno, USA," should read -- "On CSI subband size," 3GPP TSG RAN WG1 #91, Reno, USA, --.

Page 2: Other Publications, Line 8: "Project, Valbonne, France (Nov. 27-Dec. 1, 2017)." should read -- Project, Valbonne, France (Nov. 27 - Dec. 1, 2017). --.

Page 2: Other Publications, Line 13: "Project, Valbonne, (Feb. 26-Mar. 2, 2016)." should read -- Project, Valbonne, (Feb. 26-Mar. 2, 2018). --.

Page 2: Other Publications, Line 21: ""draftCR to 38-214 capturing the Jan. 18 ad-hoc and RAN1#92" should read -- "draftCR to 38.214 capturing the Jan. 18 ad-hoc and RAN1#92 --.

Page 2: Other Publications, Line 23: "Athens, Change Request 38-214, pp. 1-79, 3rd Generation Partner-" should read -- Athens, Change Request 38.214, pp. 1-79, 3rd Generation Partner- --.

Page 2: Other Publications, Line 30: "(Release 15)," 3GPP TS 38.214 V2.0.0, R2-172416, pp. 1-71, 3rd" should read -- (Release 15)," 3GPP TS 38.214 V2.0.0, RP-172416, pp. 1-71, 3rd --.

Page 2: Other Publications, Line 48: "specification (Release 15)," 3GPP TS 38.331 V15.0.0, 3rd Genera-" should read -- specification (Release 15)," 3GPP TS 38.331 V15.0.0, Total 188 pages, 3rd Genera- --.

Signed and Sealed this  
Second Day of August, 2022

Katherine Kelly Vidal  
*Director of the United States Patent and Trademark Office*

CERTIFICATE OF CORRECTION (continued)
U.S. Pat. No. 11,239,950 B2

Page 2: Other Publications, Line 54: "3rd Generation Partnership Project;Technical Specification Group" should read -- "3rd Generation Partnership Project;Technical Specification Group --.

Page 2: Other Publications, Line 57: "(Release 14), 3GPP TS 36.331 V14.4.0, pp. 1-753, 3rd Generation" should read -- (Release 14)," 3GPP TS 36.331 V14.4.0, pp. 1-753, 3rd Generation --.

Page 3: Other Publications, Lines 17-18: ""Partial band CSI reporting," 3GPP TSG-RAN WG1 #91, Nagoya, Japan," should read -- "On remaining details of CSI reporting," 3GPP TSG-RAN WG1 #91, Reno, USA, --.

Page 3: Other Publications, Line 19: "France (Sep. 18-21, 2017)." should read -- France (Nov. 27 - Dec. 1, 2017). --.

In the Claims

Claim 7: Column 44, Line 19: "wherein the resource block remainder equals mod ((the" should read -- wherein the resource block remainder equals mod (the --.